(12) United States Patent
Mullen et al.

(10) Patent No.: US 7,003,560 B1
(45) Date of Patent: Feb. 21, 2006

(54) DATA WAREHOUSE COMPUTING SYSTEM

(75) Inventors: Nancy K. Mullen, Mundelein, IL (US); Michael J. Green, Chicago, IL (US)

(73) Assignee: Accenture LLP, Palo Alto, CA (US)

( * ) Notice: Subject to any disclaimer, the term of this patent is extended or adjusted under 35 U.S.C. 154(b) by 740 days.

(21) Appl. No.: 09/705,576

(22) Filed: Nov. 3, 2000

Related U.S. Application Data

(60) Provisional application No. 60/163,477, filed on Nov. 3, 1999.

(51) Int. Cl.
*G06F 15/173* (2006.01)

(52) U.S. Cl. ........................... 709/223; 709/224

(58) Field of Classification Search ............... 709/226, 709/219, 224; 713/201, 187; 702/184; 719/519; 370/229
See application file for complete search history.

(56) References Cited

U.S. PATENT DOCUMENTS

| | | | |
|---|---|---|---|
| 5,287,266 A | | 2/1994 | Malec et al. |
| 5,295,064 A | | 3/1994 | Malec et al. |
| 5,475,753 A | * | 12/1995 | Barbara et al. ............. 713/187 |
| 5,495,610 A | | 2/1996 | Shing et al. |
| 5,602,997 A | | 2/1997 | Carpenter et al. |
| 5,630,068 A | | 5/1997 | Vela et al. |
| 5,682,525 A | | 10/1997 | Bouve et al. |
| 5,729,697 A | | 3/1998 | Schkolnick et al. |
| 5,732,399 A | | 3/1998 | Katiyar et al. |
| 5,740,549 A | | 4/1998 | Reilly et al. |
| 5,751,246 A | | 5/1998 | Hertel |
| 5,821,513 A | | 10/1998 | O'Hagan et al. |
| 5,859,969 A | | 1/1999 | Oki et al. |
| 5,877,759 A | * | 3/1999 | Bauer .......................... 719/317 |
| 5,892,905 A | * | 4/1999 | Brandt et al. ............... 713/201 |
| 5,920,700 A | * | 7/1999 | Gordon et al. ............. 709/226 |
| 5,979,757 A | | 11/1999 | Tracy et al. |
| 6,006,171 A | * | 12/1999 | Vines et al. ................ 702/184 |
| 6,023,766 A | * | 2/2000 | Yamamura .................. 713/201 |

(Continued)

FOREIGN PATENT DOCUMENTS

EP      0 697 669      8/1994

(Continued)

OTHER PUBLICATIONS

Hanai et al, An Integrated Software Maintenance Environment Bridging Configuration Management and Quality Management, IEEE Computer society press, Oct. 24, 1988, pp. 40-44.*

(Continued)

*Primary Examiner*—John Follansbee
*Assistant Examiner*—Kenny Lin
(74) *Attorney, Agent, or Firm*—Brinks Hofer Gilson & Lione

(57) ABSTRACT

A data warehouse computing system including a server connected to a client, a data warehouse architecture, metadata management, a population architecture, an end-user access architecture, an operations architecture, and a development architecture. The operations architecture includes a server connected with a client, a software distribution tool, a configuration and asset management tool, a fault management and recovery management tool, a capacity planning tool, a performance management tool, a license management tool, a remote management tool, an event management tool, a systems monitoring and tuning tool, a security tool, a user administration tool, a production control application set, and a help desk tool. The development architecture includes a process management tool, a personal productivity tool, a quality management tool, a system building tool, an environment management tool, a program and project management tool, a personal productivity tool and an information management tool.

30 Claims, 7 Drawing Sheets

U.S. PATENT DOCUMENTS

| | | | |
|---|---|---|---|
| 6,112,304 | A | 8/2000 | Clawson |
| 6,198,722 | B1 * | 3/2001 | Bunch .................... 370/229 |
| 6,289,382 | B1 * | 9/2001 | Bowman-Amuah ......... 709/226 |
| 6,321,263 | B1 * | 11/2001 | Luzzi et al. ............... 709/224 |
| 6,366,912 | B1 * | 4/2002 | Wallent et al. .............. 707/9 |
| 6,457,066 | B1 * | 9/2002 | Mein et al. ................. 719/330 |
| 6,782,408 | B1 * | 8/2004 | Chandra et al. ........... 718/104 |

FOREIGN PATENT DOCUMENTS

| | | |
|---|---|---|
| EP | 0 669 733 | 8/1995 |
| EP | 0 435 225 | 3/1997 |
| EP | 0 865 006 | 9/1998 |
| GB | 2 315 891 | 2/1998 |
| WO | WO 98/26357 | 6/1998 |
| WO | WO 00/51042 | 8/2000 |

OTHER PUBLICATIONS

Hugh W. Ryan, Scott R. Sargent, Tomothy M. Boudreau, Yannie S. Arvanitis, Stanton J. Taylor, and Craig Mindrum, "Practical Guide to Client Server Computing," Second Edition, 1998.

Hugh W. Ryan, Michael W. Alber, Stanton J. Taylor, Richard A. Chang, Yannis S. Arvanitis, Michael C. Davis, Nancy K. Mullen, Shari L. Dove, Prem N. Mehra, and Craig Mindrum, "Netcentric Computing: Computing, Communications, and Knowledge," 1998.

"Case-based Reasoning System for and Executive Briefing Book," *IBM Technical Disclosure Bulletin*, vol. 34, pp. 380-381 (1991).

"Client/Server Programming with OS/2 2.0," pp. 10-24, 111-123, 125-137, 149-160 and 588-594 (1992).

Paulina Borsook, "Seeking Security," *State of the Art*, 18, No. 6, pp. 119-122, 124, 126 and 128 (1993).

Robert Orfali and Dan Harkey, "Client/Server With Distributed Objects," *Special Report, Client/Server Computing*, 20, No. 4, pp. 151-152, 154, 156, 158-160 and 162 (1995).

Robert Orfali, Dan Harkey and Jeri Edwards, "Intergalactic Client/Server Computing," *Special Report*, 20, No. 4, pp. 108-110, 114, 118, 120 and 122 (1995).

Bradley J. Rhodes and Thad Starner, "Remembrance Agent, A Continuously Running Automated Information Retrieval System," published in, *The Proceedings of the First International Conference on The Practical Application of Intelligent Agents and Multi Agent Technology*, pp. 487-495 [online] [retrieved on May 8, 2001] retrieved from the Internet: <URL: http://rhodes.www.media.mit.edu/people/Rhodes/Papers/remembrance.html (1996).

"3Com PalmPilot Gets Web Browser, Paging, Fax," *Newsbytes News Network*, Dialog Web pp. 1-3 (1997).

Hiroshi Tsuda, Kanji Uchino and Kunio, "WorkWare: WWW-based Chronologic Document Organizer," *IEEE*, pp. 380-385 (1998).

J. Smeets and S. Boyer, "Internet and Client Server Patent Information Systems: New Services From Derwent," *Commercially Developed Systems/World Patent Information*, 20, pp. 136-139 (1998).

Loring Wirbel, "Software Tools—Startup's Package Creates New Channels in Handhelds," *Electronic Engineering Times*, pp. 72 Dialog Web Pages 1-2 (1998).

Paula Rooney, "Solutions Built for Palmtops—Apps to Fuel Sales," *Computer Retail Week*, pp. 25 Dialog Web Pages 1-2 (1998).

"PageNet to Eliminate 1,800 Jobs, Become Content Carrier, " *Newsbytes News Network*, Dialog Web pp. 1-3 (1998).

Application as filed, entitled "A System, Method and Article of Manufacture for Location-Based Filtering For A Shopping Agent in the Physical World," U.S. Appl. No. 09/259, 902, filed Feb. 26, 1999.

Application as filed in Taiwan, entitled, "A System, Method and Article of Manufacture for Advanced Information Gathering for Targeted Activities," U.S. Appl. No. 89/103, 627, filed Feb. 29, 2000.

Kimball, Ralph. *Practical Techniques for Building Dimensional Data Warehouses*, The Data Warehouse Toolkit, pp. 21-22, Published prior to the filing of the application.

* cited by examiner

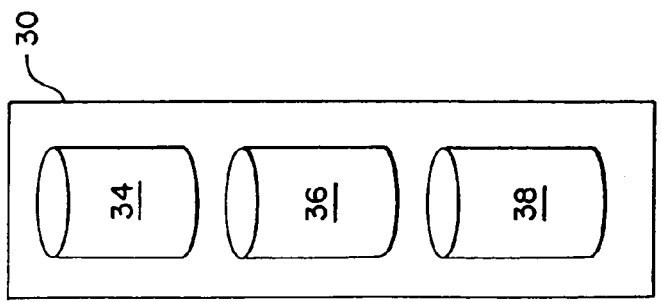
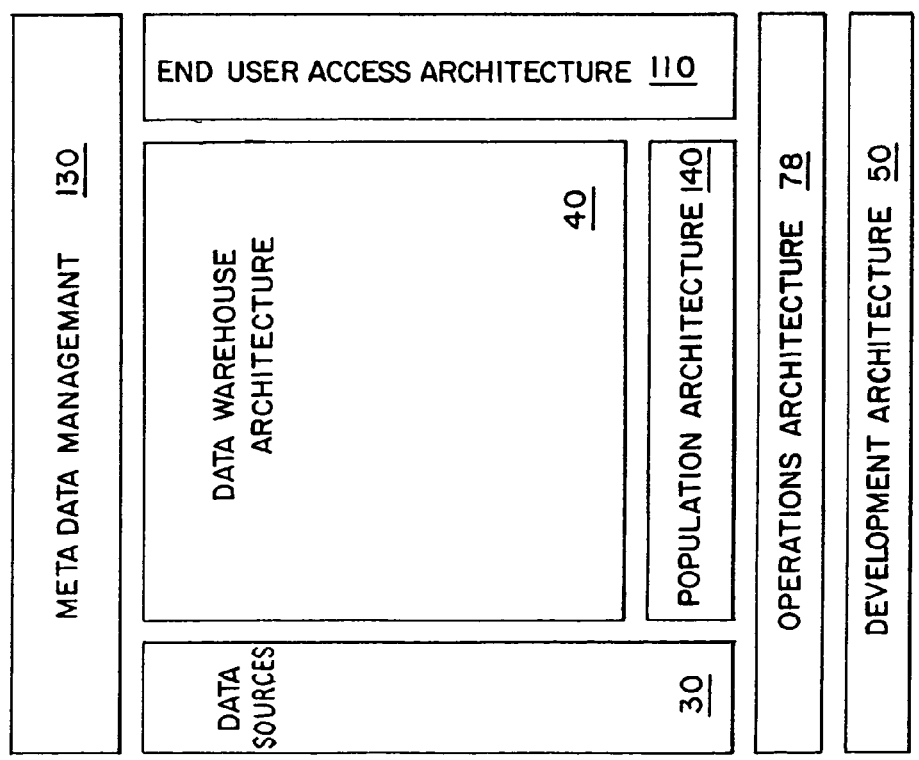

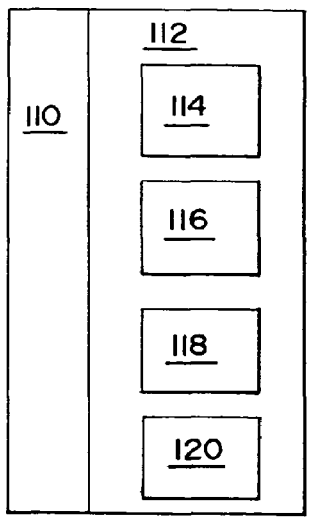
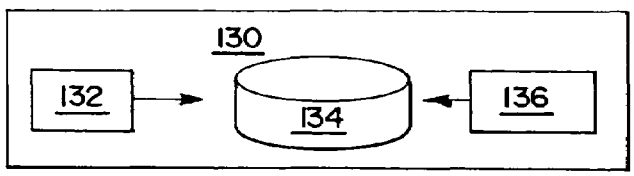
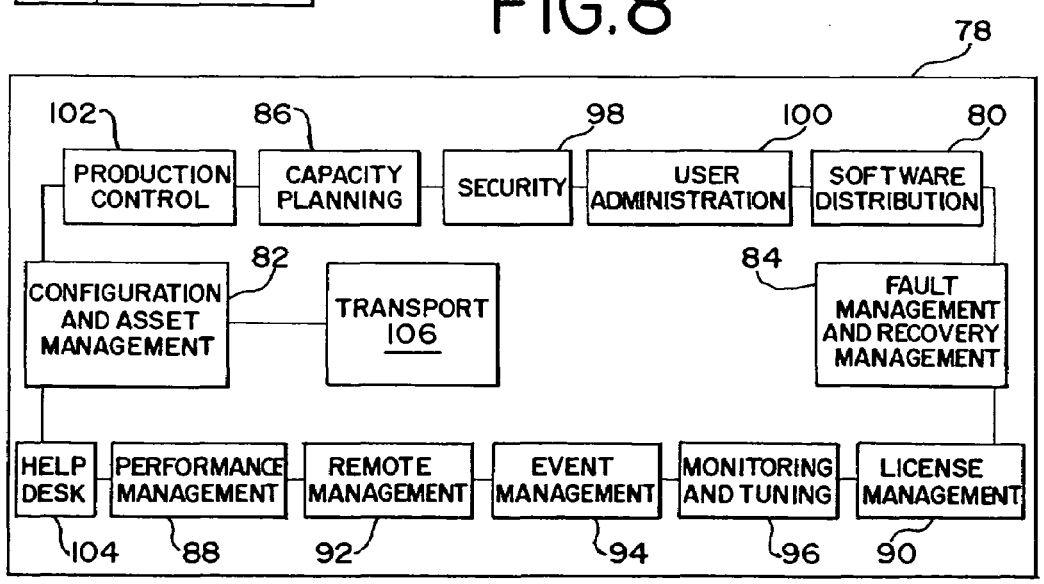
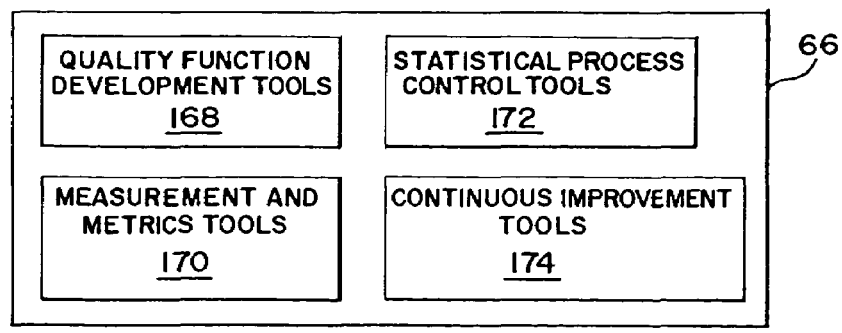

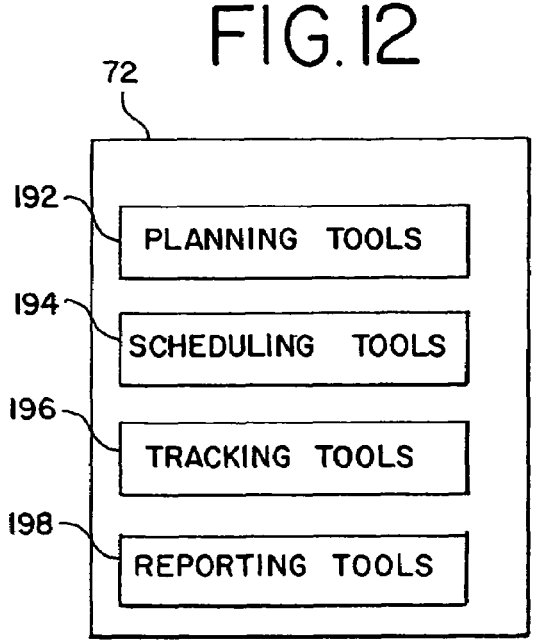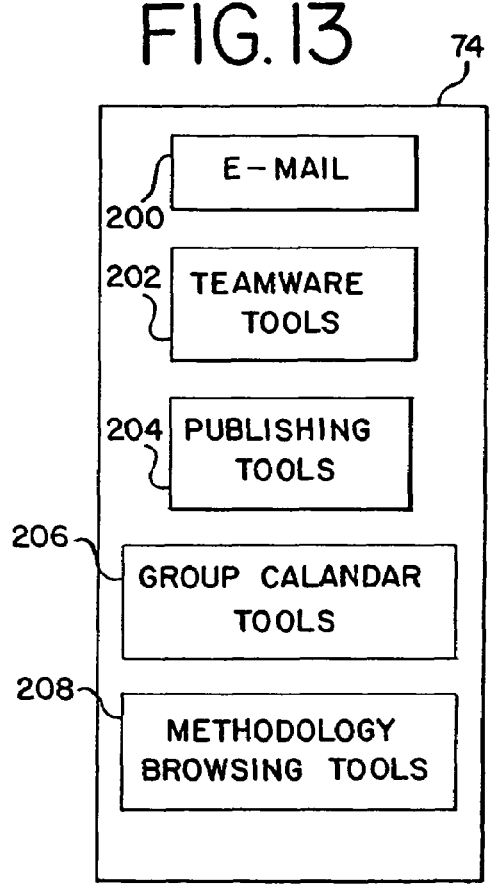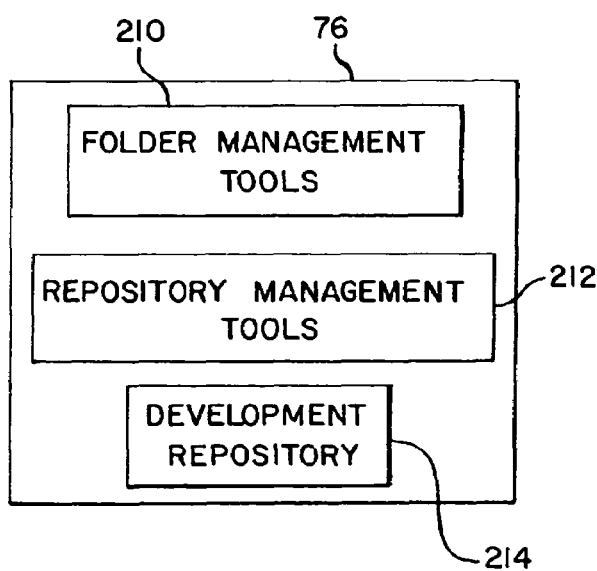

DATA WAREHOUSE COMPUTING SYSTEM

REFERENCE TO EARLIER FILED APPLICATION

The present application claims the benefit of the filing date under 35 U.S.C. § 119(e) of Provisional U.S. Patent Application No. 60/163,477, filed Nov. 3, 1999, which is incorporated by reference herein; U.S. patent application Ser. No. 09/677,065, filed on Sep. 29, 2000, which is incorporated by reference herein; and U.S. patent application Ser. No. 09/676,584, filed on Sep. 29, 2000, which is incorporated by reference herein.

FIELD OF THE INVENTION

The present invention relates generally to business computing systems, and more particularly, to a data warehousing end-to-end architecture.

BACKGROUND

Computer-based business solutions have existed for various different types of transactions since the mid-to-late 1960s. During this time period, the technology focused on the use of batch technology. In batch processing, the business user would present a file of transactions to the application. The computer system would then run through the transactions, processing each one, essentially without user intervention. The system would provide reporting at some point in the batch processing. Typically, the reports would be batch-printed, which, in turn, would be used by the business user to correct the input transactions that were resubmitted along with the next batch of transactions.

In the 1970s, businesses began a transition to on-line, interactive transactions. At a conceptual level, this processing opened up the file of transactions found in batch transactions and allowed the user to submit them one at a time, receiving either immediate confirmation of the success of the transaction or else feedback on the nature of the transaction error. The conceptually simple change of having the user interact with the computer on a transaction-at-a-time basis caused huge changes in the nature of business computing. More important, users saw huge changes in what they could do on a day-to-day basis. Customers were no longer forced to wait for a batch run to process the particular application. In essence, the computer had an impact on the entire workflow of the business user.

Along with the advent of on-line interactive systems, it was equally significant that the systems provided a means for the business user to communicate with others in the business as the day-to-day business went along. This capability was provided on the backbone of a wide area network (WAN). The WAN was in itself a demanding technology during this time period and, because of these demands, telecommunications groups emerged within organizations, charged with the responsibility to maintain, evolve and manage the network over a period of time.

After the advent of on-line interactive systems came the advent of database warehousing end-to-end technology architecture, referred to herein as a data warehouse computing system. FIG. 1 illustrates a high level physical schematic of a data warehouse computing system which includes hardware and software that provide for and support the processing, storage and access of data as it flows from data sources to an end user, as illustrated by the use of arrows. Data warehouse computing systems allow end-users to access select data from data sources without needing to access the data sources themselves. Data sources are the operational, legacy system and external databases in which data, needed by end-users, resides. Data usually resides in data sources as transaction records. Typically, a data warehouse computing system also includes a refining process, a data warehouse component, and a data mart, as illustrated in FIG. 1. The refining process is a process that extracts, cleans, and summarizes the data from data sources so that the data can be loaded into the data warehouse component in an organized fashion. The data warehouse component and the data mart serve as storage areas to hold data as it is transformed from transaction records to information accessed by the end-user. Data warehouse computing systems make it more convenient for an end-user to access the data stored in data sources and to ensure that the data stored in data sources can be updated while maintaining the integrity of the data. Keeping a data warehouse computing system available and under control, while providing a high level of service to the end user, is complex and difficult. Unfortunately, not all organizations are aware of this complexity, as they should be. Organizations need to implement an operations architecture and a development architecture in a data warehouse computing system in order, not only to keep an organization's internal data warehouse computing system up and running, but also to maintain a data warehouse computing system that extends to business partners and customers and to support the tasks involved in the analysis, design, and construction of a data warehouse computing system, as well as the associated management processes.

SUMMARY

The present invention discloses an execution architecture for a data warehouse computing system including a server connected to a client. The preferred execution architecture includes a data warehouse architecture, metadata management, a population architecture and an end-user access architecture. In one embodiment an operations architecture, as well as a method of providing an operations architecture, for a data warehouse computing system that includes a server connected with multiple clients, is disclosed. The clients may be remote clients or clients that are connected with the network of the data warehouse computing system through a LAN connection or some other equivalent network connection. Preferentially, the clients access all of the tools and resources of the data warehouse computing system through web browser applications that interact with the server of the data warehouse computing system.

The preferred operations architecture includes a software distribution tool for providing automated delivery to, and installation of, applications on the server or the clients. A configuration and asset management tool is also included in the operations architecture for managing a plurality of predetermined assets connected with said data warehouse computing system. These assets could be servers, clients, printers, and various other computing devices that are connected with the data warehouse computing system.

A fault management and recovery management tool is also provided in the preferred operations architecture for assisting in the diagnosis and correction of a plurality of system faults in said data warehouse computing system. Those skilled in the art would recognize that several system faults may occur in the data warehouse computing system and that the preferred fault management and recovery tool is able to deal with and correct these system faults.

In addition, the preferred operations architecture also includes a capacity planning tool that monitors a plurality of predetermined system usage levels in the data warehouse computing system. The system usage levels may be selected from, but are not limited to, the group consisting of server processing usage, server bandwidth usage, server storage usage and client usage. A performance management tool is also included in the operations architecture for monitoring the performance of applications running on the data warehouse computing system. A license management tool of the operations architecture manages and controls software license information for applications running on the data warehouse computing system.

The preferred operations architecture also includes a remote management tool that allows support personnel from the data warehouse computing system to take control of a client if required. This allows support personnel to diagnose and repair problems with the client if they occur during operation. An event management tool of the operations architecture handles a plurality of predetermined events in the data warehouse computing system. The predetermined events the event management tool are designed to handle include a broad category of events, including, but not limited to disk space indications, central processing unit utilization, database error indications, network error indications, application error indications and file and print service indications.

A systems monitoring and tuning tool is also provided by the preferred operations architecture for monitoring applications and computing devices connected with the data warehouse computing system. The preferred monitoring and tuning tools are capable of monitoring applications, middleware, databases, networks, clients and servers and the tuning tools are capable tuning applications and dealing with network capacity issues. The preferred operations architecture also includes a security tool that includes a security application that provides security to the resources of the data warehouse computing system. A user administration tool is also provided in the preferred operations architecture for administering users of the data warehouse computing system. Administering users includes such tasks as adding new users, deleting users, setting up access rights for users and removing access rights for users, to name just a few.

A production control application set for scheduling and handling a plurality of production processes on said data warehouse computing system. In the preferred embodiment, the production control application set may be selected from the group consisting of a print management tool, a file transfer and control tool, a mass storage management tool, a backup and restore tool, an archiving tool and a system startup and recovery tool. A help desk tool is also part of the preferred operations architecture and includes a help application that provides users of applications on the data warehouse computing system with assistance during times of need.

The present invention also discloses a development architecture, and a method of providing a development architecture, for a data warehouse computing system. The preferred development architecture includes a server that is connected with a client. The server provides a common user interface between the server and the client, which is preferentially accomplished, at least in part, with the use of a web browser on the client. A personal productivity tool is provided that may be selected from the group consisting of a spreadsheet application, a graphic application, a word processor application and a personal calendar application for use by said client and said server.

A quality management tool is also provided for assuring that a predetermined agreed upon level of quality is maintained by the data warehouse computing system. As such, the quality management tool monitors transactions and the performance of applications used on the data warehouse computing system to ensure an adequate level of quality is maintained. A set of system building tools are also provided for designing, building and testing applications on the data warehouse computing system. An environment management tool for monitoring the performance of said data warehouse computing system;

The preferred embodiment of the development architecture also includes a program and project management tool for planning, scheduling, tracking and reporting on project segments of the data warehouse computing system. A team productivity tool is also included in the preferred embodiment that allows users on the development architecture to communicate with other users of the development architecture in the data warehouse computing system. An information management tool is also provided including a development repository, a folder management tool and a repository management tool. Further, a process management tool is also provided that allows a respective tool to communicate with another respective tool of the development architecture in the data warehouse computing system.

In the preferred embodiment of the present invention, the system building tools may be selected from the group consisting of an analysis and design tool, a reverse engineering tool, various construction tools and a configuration management tool. The analysis and design tool may be selected from the group consisting of a data modeling tool, a process modeling tool, an event modeling tool, a database design tool, application logic design tool, a presentation and design tool, a communication design tool, a performance modeling tool and a component modeling tool. The reverse engineering tool may be selected from the group consisting of a system structure analysis tool, an extraction tool, a repository population tool and a restructuring tool. The construction tools of the system building tools may be selected from the group consisting of a publishing and page mark-up tool, a source code editor tool, a generation tool, a compiler/linker/interpreter/debugger tool and a construction utility tool. The configuration management tool includes a version control tool and a migration control tool.

The environment management tool of the preferred development architecture may be selected from the group consisting of a service management tool, a system management tool, a managing change tool and a service planning tool. The program and project management tool of the preferred development architecture may be selected from the group consisting of a planning tool, a scheduling tool, a tracking tool and a reporting tool. The team productivity tool may be selected from the group consisting of an E-mail tool, a teamware tool, a publishing tool, a group calendar tool and a methodology browsing tool.

The presently disclosed development architecture provides an optimal development environment for a data warehouse computing system. As set forth above, the development architecture provides a combination of development tools that are used as part of the preferred development architecture. These tools allow enterprises to maintain operations and develop new applications to be used on the data warehouse computing system, thereby allowing the enterprises to constantly make updates and integrate change in the data warehouse computing system.

Further objects and advantages of the present invention will be apparent from the following description, reference being made to the accompanying drawings wherein preferred embodiments of the present invention are clearly shown.

BRIEF DESCRIPTION OF THE DRAWINGS

FIG. 2 is a conceptualized schematic representation of a data warehouse computing system, in accordance with one embodiment;

FIG. 3 is a schematic representation of data sources for a data warehouse computing system, in accordance with one embodiment;

FIG. 6 is a schematic representation of an end-user access architecture for a data warehouse computing system, in accordance with one embodiment;

FIG. 7 is a schematic representation of metadata management for a data warehouse computing system, in accordance with one embodiment;

FIG. 8 is a schematic representation of an operations architecture for a data warehouse computing system, in accordance with one embodiment;

FIG. 9 is a schematic representation of quality management tools for a development architecture, in accordance with one embodiment;

FIG. 12 is a schematic representation of program and project management tools for a development architecture, in accordance with one embodiment;

FIG. 13 is a schematic representation of team productivity tools for a development architecture, in accordance with one embodiment; and FIG. 14 is a schematic representation of information management tools for a development architecture, in accordance with one embodiment.

DETAILED DESCRIPTION

The presently preferred embodiments will now be described more fully hereinafter with reference to the accompanying drawings, in which the presently preferred embodiments are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable storage medium may be utilized including read-only memory (ROM), RAM, DRAM, SDRAM, hard disks, CD-ROMs, DVD-ROMs, any optical storage device, and any magnetic storage device.

FIG. 2 illustrates the overall execution architecture of a data warehouse computing system 20. Data warehouse computing system 20 may be embodied as one program, as a method, or as a data processing system. Accordingly, data warehouse computing system 20 may take the form of an entirely hardware embodiment, an entirely software embodiment or an embodiment combining software and hardware aspects. End-users 24 can access data stored within data warehouse computing system 20 through a client 26. As used herein, client 26 is any device that can process, send and receive digital signals known to one of ordinary skill in the art, such as a microcomputer, a personal digital assistant (PDA), a cellular phone, a wireless pager, an internet appliance, or any other device that utilizes a computer processor.

Figure 1:
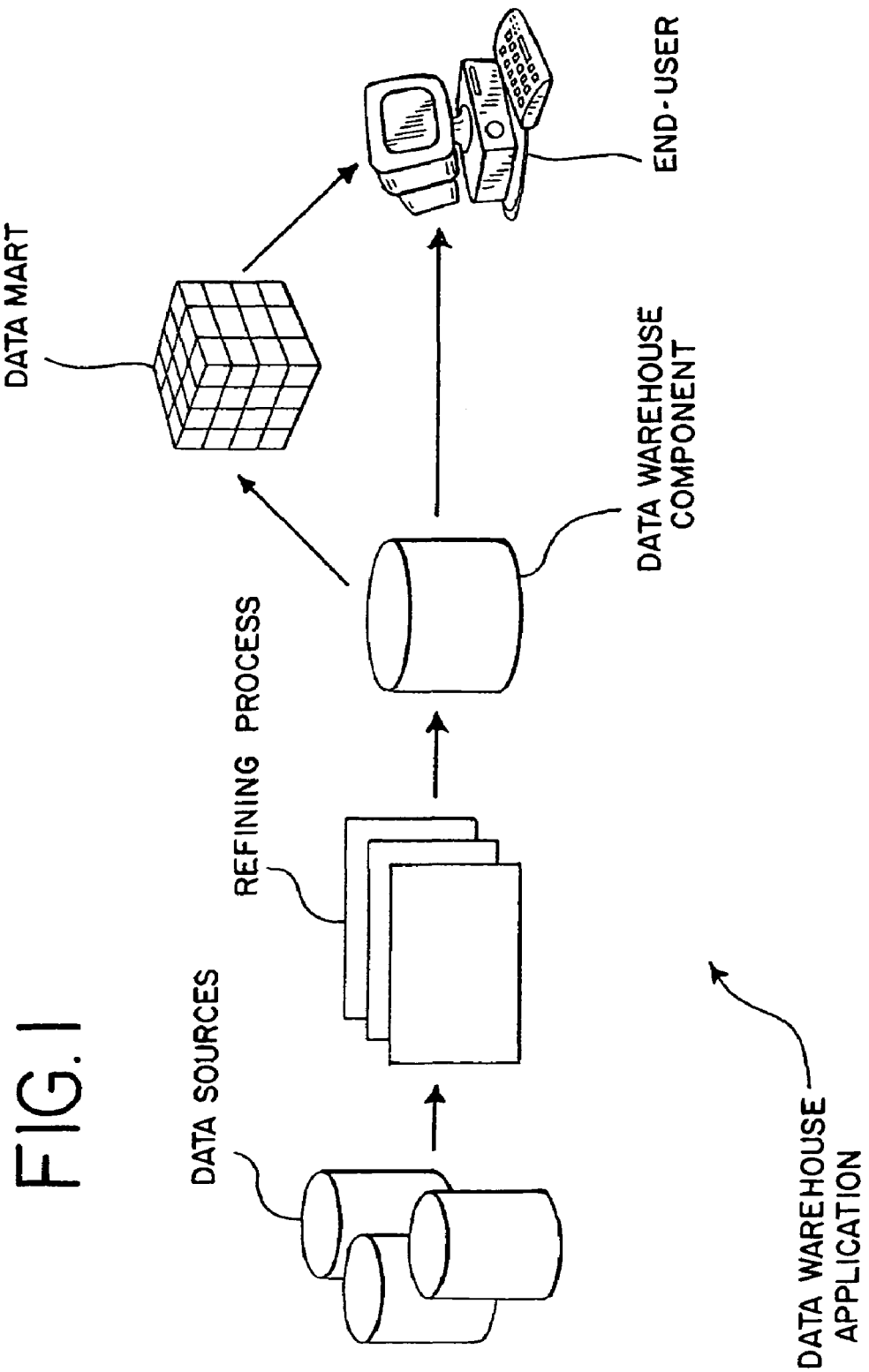
FIG. 1 is a physical schematic representation of a data warehouse computing system.
Figure 2A:
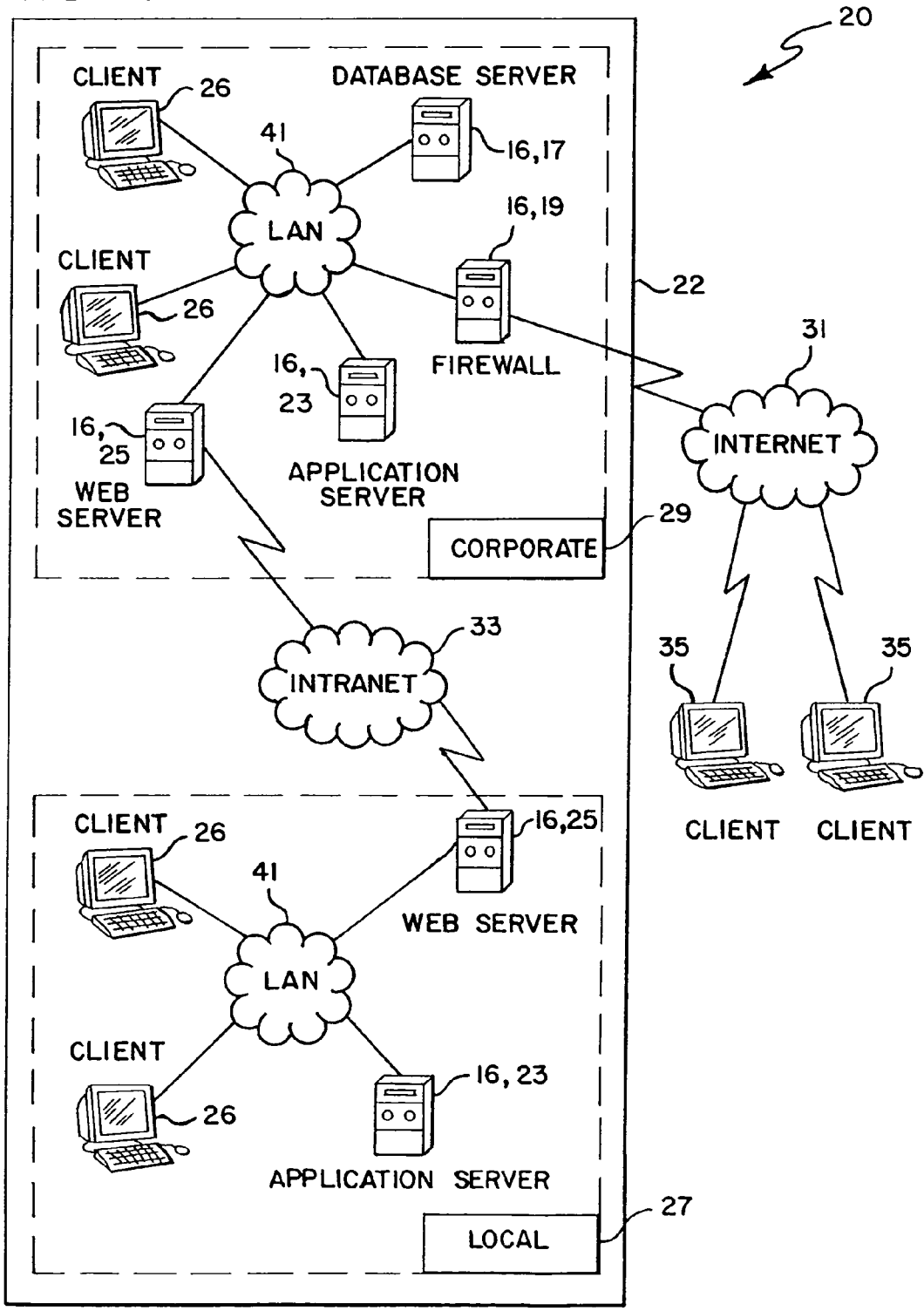
FIG. 2A is a physical picture of an illustrative data warehouse computing system, in accordance with one embodiment.

The preferred data warehouse computing system 20 includes at least one client 26 that is connected, via a network connection, to at least one server 16. Server 16 includes any type device which can serve information upon request, such as, but not limited to, a database server 17, a firewall server 19, an application server 23, and a web server 25, as illustrated in FIG. 2A. The development architecture 50 is used to design, build and enhance the data warehouse computing system 20, as set forth in greater detail below. Referring to FIG. 2A, the physical picture of an illustrative data warehouse computing system 20 is illustrated. In this example, a business enterprise 21 includes at least one client 26, at least one database server 16, an optional firewall 19, an optional application server 23, an optional web server 25 and a local area network (LAN) connection 41, which are electrically connected as illustrated in FIG. 2A.

As generally known in the art, LAN connections 41 generally include software applications and various computing devices (i.e.—network cards, cables, hubs, routers, etc.) that are used to interconnect various computing devices (i.e.—clients 26 and servers 16) that are located at a first business enterprise location 29 to form a computing network at that location. The term LAN connection 41, as used herein, should be broadly construed to include any and all hardware devices and software applications that allows clients 26, servers 16 or other computing devices to be electrically connected together so that they can share and transfer data between devices over the network. Although not illustrated, other devices and resources, such as printers for example, may be connected with the LAN connection 41 so that the devices and resources are available to users of the network. Those skilled in the art would recognize that various types of LAN connections 41 exist and may be used in the present invention.

For the purpose of the present invention, the firewall server 19 is used to isolate internal systems from unwanted intruders. In particular, firewall server 19 isolates web servers 25 from all Internet traffic that is not relevant to the data warehouse computing system 20. In the preferred embodiment, the only requests allowed through the firewall 19 are for services located on the web servers 25. All requests for other applications (e.g., FTP, Telnet) and other IP addresses that the data warehouse computing system 20 receives are typically blocked by the firewall 19 during operation of the data warehouse computing system 20.

As further illustrated in FIG. 2A, a second business enterprise location 27 may be connected with the first business enterprise location 29 using an intranet connection 33. Those skilled in the art would recognize that various intranet connections 33 exist and may be used in the present invention. The intranet connection 33 allows the computing resources of the second business enterprise location 27 to be shared or connected with the computing resources available at the first business enterprise location 29. The term intranet connection 33, as used herein, should be broadly construed to include communication devices and software applications as well as various other connection devices used to physically interconnect two or more business networks. Although not illustrated, several other enterprise locations, each containing its own computing resources, may be connected with the data warehouse computing system 20 using other intranet connections 33.

In the preferred embodiment illustrated in FIG. 2A, the firewall server 19 of the first business enterprise location 29 is connected with an Internet connection 31 to a plurality of remote clients 35. The remote clients 35 that are connected to the Internet connection 31 preferentially access data and communicate with the services of the data warehouse computing system 20 through the Internet connection 31 using web browser applications that are located and running on the clients 35. The Internet connection 31 gives the remote clients 35 the ability to gain access to applications, information and data content that may be located on the servers 16.

As used herein, the term Internet connection 31 should be broadly construed to include any software application and hardware device that is used to connect the remote clients 35 and the servers 16 with an Internet service provider (not illustrated) that establishes a connection to the Internet. Those skilled in the art would recognize that the remote clients 35 and the servers 16 may establish an Internet connection 31 using one of several methods known in the art. For the purpose of the present invention, it is only important to understand that the remote clients 35 and servers 16 are respectively connected with each other through the Internet connection 31.

In one embodiment, data warehouse computing system 20 includes data sources 30, data warehouse architecture 40, development architecture 50, end-user access architecture 110, metadata management 130, operations architecture 78, and population architecture 140, as illustrated in FIG. 2. Referring to FIG. 3, data sources 30 represent the stores of data collected and stored by operational and transaction processing (OLTP) business applications that are the origin of the information required for end-user reporting in data warehouse computing system 20. Data warehouse computing system 20 generally starts with a single source of data, or the smallest number of sources required to fulfill initial reporting and analytical needs, and expands in an iterative nature to include more source and external systems, as necessary, throughout the life of the data warehouse computing system 20. Data sources 30 include data such as, data from an enterprise resource planning system 34, legacy data 36 from other internal systems, and external data 38. Enterprise resource planning (ERP) systems 34, such as SAP, Peoplesoft and Oracle Applications, have been high-priority sources for data warehousing efforts and can have highly complex or unknown data models, so they often contain specific mechanisms to extract and interpret data. Legacy data 36 is a catch-all term for data sources from non-ERP systems. These system are often older-technology or mature file systems (such as VSAM), and databases (such as DB2, or a networked or hierarchical database such as IMS or Adabas). Data warehouse computing systems 20 are often supplemented by external data 38. External data 38 is data from sources external to the organization, such as, for example, published marketing and financial databases and reports. These sources are sometimes included in later iterations of a data warehouse computing system 20, as they often contain 'nice-to-have' data that can supplement and enhance existing corporate data to improve the benefit of data already captured in a data warehouse computing system 20.

Figure 4:
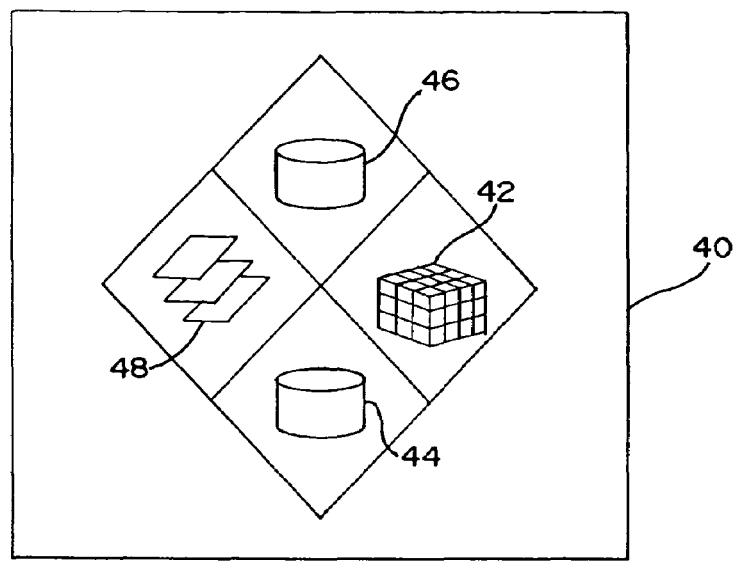
FIG. 4 is a schematic representation of a data warehouse architecture for a data warehouse computing system, in accordance with one embodiment.

FIG. 4 illustrates the data warehouse architecture 40 of data warehouse computing system 20. The data warehouse architecture 40 is defined in discrete components which are often designed and built, to a non-trivial degree for large complex projects, by separate project teams. Preferably, the separate components, described below, come together to form a single unifying data warehouse architecture 40. In one embodiment, data warehouse architecture 40 includes four components, a data mart 42, a data warehouse component 44, an operational data store 46, and staging 48. The data warehouse architecture 40 also includes the physical distribution of data and processing, and the hardware and software, to support this data.

Key to the notion of a data warehouse architecture 40 is that even though a data warehouse computing system 20 by its nature is a centralized collection of data, there are still multiple ways to distribute the data from the data sources 30 to the end-user 24 to meet the end-user's performance, availability and scalability requirements. The data warehouse architecture 40 is formed based on decisions made to determine how data should be stored and physically distributed to meet both end-user and operational requirements.

Given all the components within the data warehouse architecture 40, there are many ways to move data from the data sources 30 to the end-user 24. These multiple 'paths' of data flow exist depending on the types of end-users 24 and their data and access requirements. In one embodiment, the data travels from data source 30 to staging 48, from staging 48 to the data warehouse component 44, and from the data warehouse component 44 to the user. This is the most straightforward path for data to travel, since the end-users 24 access data directly from the data warehouse component 44. In another embodiment, the data travels from data source 30 to staging 48, from staging 48 to the data warehouse component 44, from the data warehouse component 44 to the data mart 42, and from the data mart 42 to the user. The number and location of data marts 42 can vary based on performance, availability and scalability requirements of the end-users 24. End-users 24 may access data out of both the data mart 42 and the data warehouse component 44, depending on the level of detail that is needed from the data. In yet another embodiment, the data travels from data source 30 to staging 48, from staging 48 to the operational data store 46, from the operational data store 46 to the data warehouse component 44, from the data warehouse component 44 to the data mart 42, and from the data mart 42 to the user. The operational data store 46 is used for both operational reporting and staging into the data warehouse component 44. The data warehouse component 44 is fed from the operational data store 46, and potentially from other data sources as well. Any number of data marts 42 may exist to support the data warehouse component 44. End-users 24 can access any one of the operational data store 46, the data warehouse component 44, and the data mart 42, depending on the reporting needs of end user 24. The processes that extract, transform and load data throughout the data warehouse architecture 40 are performed in population architecture 140. Data mart 42 is a grouping of data specific to a single subject area, department or user class. Preferably, the data in data mart 42 is optimized for fast access and analytical reporting, so the data structures will be highly summarized and indexed. Using a data mart 42 within a data warehouse architecture 40 is not required, and only becomes desirable based on reporting needs of the end-user 24. For example, in one embodiment, data warehouse architecture 40 does not include a data mart 42. However, in one embodiment, data warehouse architecture 40 does include a data mart 42. Preferably, data warehouse architecture 40 includes multiple data marts 42 for a single data warehouse component 44, developed in an iterative fashion. Data marts 42 should be fed from a single point of collection, namely the data warehouse component 44, for consistent data views throughout the enterprise. Feeding data marts 42 directly from data sources 30 runs the risk of multiple inconsistent views of the same data throughout the enterprise, as well as multiple redundant processes requiring high levels of change and support when the data sources 30 or reporting needs change. The data marts 42 can be physically implemented in the same piece of hardware, such as a server, as the data warehouse component 44, on a piece of hardware separate from the data warehouse component 44 at the same central site, or distributed regionally at the location of the end-user 24. The end-user access architecture 110 will generally dictate the architecture and placement options available.

Data warehouse component 44 is an integrated and centralized data store organized specifically for end-user 24 reporting and analytical access. The data warehouse component 44 generally consists of enterprise-wide information over multiple subject areas, and contains low-level, granular data, kept over long periods of time for historical reporting purposes. The data warehouse component 44 must be physically optimized to handle high volumes of data and concurrent end-user 24 access, and is generally lightly indexed and less normalized than data stores found within an operational system. As used herein the data warehouse component 40 represents the sum total of data stores and processes found within the data warehouse architecture 40. In complex and high volume environments, the data warehouse component 44 will likely consist of multiple centrally located data stores that are required to handle integration and summarization of data.

The operational data store 46 is used to store detailed transactional data in a normalized format for operational reporting purposes before being summarized into the data warehouse component 44. Using an operational data store 46 within a data warehouse architecture 40 is not required. For example, in one embodiment, data warehouse architecture 40 does not include an operational data store 46. However, in one embodiment, data warehouse architecture 40 does include an operational data store 46. Preferably, the operational data store 46 is updated on a real-time or near real-time basis, sometimes from other operational systems, sometimes from actual user updates. The operational data store 46 is created to handle architectural requirements for performance, scalability and near-real-time operational reporting.

Staging 48 is a temporary area in which data is staged for efficient transformation and loading into a data warehouse component 44. No end-user access occurs within staging 48, and files within staging 48 are generally deleted or overwritten when the next batch of data needs to be staged. Staging 48 often occurs using temporary 'flat', non-indexed files for use by transform and load processes. Architecture issues in designing staging 48 include determining if the staging area should reside on the same physical hardware or within the same physical database as the data warehouse component 44, or if volumes and loads are heavy enough to warrant placing part or all of area on a separate server from the rest of the data warehouse component 44. The more data sources and the larger the volumes, the more complex staging 48 will become and the more likely more sophisticated storage mechanisms for the data, such as using a relational database instead of a flat file, will be necessary.

Figure 5:
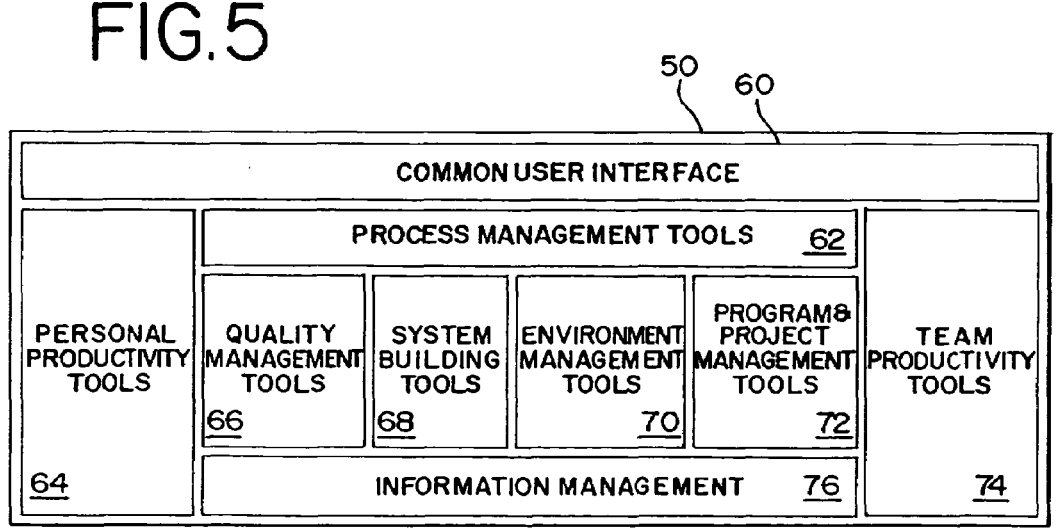
FIG. 5 is a schematic representation of a development architecture for a data warehouse computing system, in accordance with one embodiment.

FIG. 5 illustrates the development architecture 50 of data warehouse computing system 20. Development architecture 50 provides a development environment framework and associated guidelines that reduce the effort and costs involved with designing, implementing, and maintaining an integrated development environment. Development architecture 50 takes a holistic approach to the development environment by addressing three Business Integration components: organization, processes, and tools. Development architecture 50 is the production environment for one or several systems development projects as well as for maintenance efforts. We may therefore argue that the development architecture 50 requires the same attention as a similarly sized end-user execution environment. The purpose of the development architecture 50 is to support the tasks involved in the analysis, design, construction, and maintenance of business systems, as well as the associated management processes. Preferably, the development architecture 50 supports all the development tasks, not just the code/compile/test/debug cycle. It is important to get the development architecture 50 right the first time so that changes do not have to be made to the development architecture 50 in the future. Changing the development architecture 50 when construction is fully staffed may entail serious disruptions and expensive loss of productivity.

The development architecture 50 for data warehousing computing systems 20, has a few special considerations worth noting: 1) Access to test data from legacy systems may not be possible without interrupting production systems, and creating new test data may be practically impossible without creating potentially complex extracts just to have a test bed of data; 2) Building a data warehouse concurrently with a new transaction system, such as frequently occurs in ERP environments, is a challenge, since test data for a source system extract may not exist at all, or may not exist in the volumes necessary to perform a system or performance test; 3) Development and test hardware must be sized and procured in the same manner as production hardware; 4) Dedicated development and test environments may not always be available in resource-constrained environments and therefore data warehousing projects often share space with other concurrent projects; and 5) Data warehouse architectures cross multiple platforms, leading to especially complex development environments and source code version control and migration of code between development, test and release environments is also a challenge, especially in environments with heterogeneous platforms in which processing code resides.

Experience has shown that within the same medium- to large-size project, with the same people, moving from a poor to a good development architecture 50, productivity can be improved by a factor of ten for many tasks. The improvements come in two categories: 1) the elimination of redundant and non value-added tasks; and 2) the streamlining of useful tasks. While it seems intuitive that most tasks can be streamlined, the following list gives a few examples of redundant tasks that must be eliminated: 1) analysis to determine how to merge the uncoordinated changes applied by two programmers to the same module; 2) re-entry of the source code and retesting of a module, which was accidentally deleted; 3) recurring discussions about "what a design packet should contain" or "what constitutes good programming style in a particular context"; 4) repeated design, coding, testing, and maintenance of very similar logic (for example, error handling, date conversion and manipulation, main structure of a module); 5) searching for the manuals of a particular productivity tool to find information; 6) remigration to system test of a cycle, because the impact analysis for a change request was incomplete; and 7) requesting support from another team (for example, environment support, information management) and waiting unnecessarily for a response. On a smaller project, these problems can be solved using a brute force approach. This becomes very expensive as the project grows, and finally impossible. A well-designed development architecture 50 becomes important as the project team reaches 20–30 people and is absolutely critical with a project size of more than 50 people. The investment required to design, set up, and tune a comprehensive development architecture 50 is typically several hundred development days. Numbers between 400 and 800 days are commonly seen, depending on the platforms, target environment complexity, amount of reuse, and size of the system being developed and maintained.

The development architecture 50 includes a common user interface 60, a process management tool 62, a personal productivity tool 64, a quality management tool 66, several systems building tools 68, an environment management tool 70, a program and project management tool 72, a team productivity tool 74 and an information management tool 76. The purpose of the development architecture 50 is to support the tasks involved in the analysis, design, construction and maintenance of business systems used on the data warehouse computing system 20, as well as the associated management processes. The development architecture 50 provides tools and resources that are required for developers to design, build and maintain the data warehouse computing system 20.

The common user interface 60 of the development architecture 50 provides a common launching place for all of the tools in the development architecture 50 to make it integrated and consistent. All of the tools that are used in the development architecture 50 are presented to the developer via a single view of the entire environment. The common user interface 60 is used by the data warehouse computing system 20 to provide a graphical user interface (GUI) to the developer that allows the developer to access the tools of the development architecture 50 easily and consistently. Applications that support the common user interface 60 are known as window managers (e.g., Microsoft Windows, Presentation Manager and Motif).

The common user interface 60 provides several capabilities to the data warehouse computing system 20. As set forth above, the common user interface 60 provides an interactive and graphical interface to the developer through a client 26. Applications that run on the data warehouse computing system 20 are predominantly graphical in nature, typically making use of the Windows operating system. As such, graphical tools are essential, in that developers of data warehouse computing system 20 are constantly multi-tasking and therefore windowing systems are the only practical way for a developer to manage and coordinate data involved in the development process.

The preferred common user interface 60 is also capable of shielding system-level details from developers. This allows developers to pick the service desired by selecting it from a menu or an equivalent action on the client 26. As such, the common user interface 60 that is used in the development architecture 50 is also capable of automating simple details such as naming files and manipulating directories within the data warehouse computing system 20.

Another aspect that the preferred common user interface 60 supports in the development architecture 50 is the ability of developers to handle multiple, concurrent activities. Developers should not be restricted to a single development task. The common user interface 60 allows developers to simultaneously execute multiple applications and facilities from a respective client 26 without having to close out or end another application on the client 26.

The common user interface 60 also provides access to files, data, code, and tools, for example, based on privileges defined for each user of the data warehouse computing system 20. As such, the preferred common user interface includes security services to keep unwanted or unauthorized users from accessing files, data, code and tools used in the development architecture 50. The common user interface 60 also provides interactive, context-sensitive help to the developers on client 26. Architecture teams should be encouraged to deliver their API documentation, standards documentation and procedures in an online help format. Today's developers are very accustomed to searching and browsing for answers at the point of need; paper documentation is rarely used.

The process management tools 62 are used to integrate the development architecture 50 by providing tool-to-tool communication and work flow management. Tool-to-tool communication integrates tools by enabling information, in the form of short messages, to be passed from one tool to another. As such, the process management tools 62 provide structure and control over the development process as a whole (e.g., the methodology, procedures, and supporting processes). As such, the process management tools 62 provide for deeper integration than just graphical or desktop integration. The process management tools 62 integrate existing and future tools, both package and custom; provide inter-tool communications where appropriate, and integrate tools with a development repository, as discussed below.

The process management tools 62 implementation may vary greatly in complexity. At the simple end is a menu system that presents a single end-user 24 with the recommended development tasks and can launch the tool appropriate for the selected task. At the high end is a custom, complete work flow implementation that integrates the efforts of different development groups and enforces the project methodology (e.g., it supports the correct sequencing of tasks including reviews and signoffs).

As illustrated in FIG. 5, the personal productivity tools 64 of the development architecture 50 are applications or groups of applications that are used for miscellaneous single-user activities commonly encountered on a project (e.g., writing memos, preparing presentations, and performing simple what-if analyses). The personal productivity tools 64 are typically applications oriented toward individuals rather than teams (i.e., no collaboration is required) and typically consist of spreadsheet applications, graphic applications, word processor applications and personal calendar applications.

As set forth above, the personal productivity tools 64 preferentially include a spreadsheet application. End-users 24 should have the ability to access and create spreadsheet data which is used in each phase of the development process. Spreadsheet analysis may be used to analyze reports from a development repository (discussed later) to view test data/results, to perform what-if analyses for impact analysis or estimating, and to assist in modeling such system aspects as performance. Those skilled in the art would recognize that various spreadsheet applications exist and may be used in the preferred development architecture 50. Examples of spreadsheet applications that may be used include Lotus 1-2-3 and Microsoft Excel.

The personal productivity tools 64 also preferentially include graphics applications. The graphics applications are most commonly used to prepare presentations and supporting graphics for documentation. The graphics applications may be standalone tools, but are much more useful when they can be integrated directly with the repository or at least the spreadsheet package to allow graphical presentation of information (such as productivity information and quality statistics). Those skilled in the art would recognize that various graphics applications exist and may be used in the preferred development architecture 50. Examples of graphics applications that may be used include Microsoft PowerPoint, Lotus Freelance and CorelDraw.

Preferably, the personal productivity tools 64 also include a word processor application. Word processor applications provide basic forms and utilities that can be used (e.g., a form letter or memo template) by developers to document project information. Those skilled in the art would recognize that various word processing applications exist and may be used in the presently disclosed development architecture 50. Examples of word processing applications 64 that may be used include AmiPro, Microsoft Word, and WordPerfect.

Those skilled in the art would also recognize the various personal calendar applications exist and may be specially designed for use in the preferred data warehouse computing system 20. Personal calendar applications allow users to manage contacts and record various types of calendar information. The personal calendar applications are capable of generating reminders in the form of instant messages, E-mail messages, text pages, etc. Those skilled in the art would recognize that various features may be included in the preferred personal calendar application and are herein envisioned.

The preferred development architecture 50 also includes quality management tools 66. Quality management tools 66 are used to ensure that an agreed-on level of quality in the data warehouse computing system 20 is reached. These tools also provide information and process for improving quality in the data warehouse computing system 20 over time. Quality management tools 66 provide the plan, the measurement, and the feedback for improvement to meet the quality objectives of a project. Referring to FIG. 9, the preferred quality management tools 66 may be selected from the group consisting of quality function development tools 168, measurement and metrics tools 170, statistical process control tools 172 and continuous improvement tools 174.

The quality function development tools 168 are developed around the quality plan for the project or the organization. As such, those skilled in the art would recognize that the exact functions and nature of these applications will vary from organization to organization. The preferred quality function development tools 168 preferentially focus on the quality objectives that are important for a project. These are expressed in measurable terms whenever possible. For example, the quality function development tools 168 can monitor for reliability (in defects per function point), usability (user training or overall productivity), efficiency (use of systems resources), and maintainability (cost/time to correct problems and provide added functions).

The quality function development tools 168 can also be used to define input and output (I/O) criteria for each development phase. This is typically integrated with the development methodology and defines sufficiency criteria for moving from one phase of a project to the next. These criteria are important to ensure that all necessary documentation for a phase has been created and is of the expected quality before starting another phase. This helps reduce rework due to miscommunications or misunderstandings.

The preferred quality function development tools 168 are also used to perform identification and definition of the types of test, verification, and validation activities that are to be carried out during testing of different aspects of the data warehouse computing system 20. This includes a description of the activities, what they apply to (e.g., validate a functional specification), and when they should occur (e.g., before beginning technical design). The preferred quality function development tools 168 are also designed to assign specific responsibilities for quality activities. For instance, the quality function development tools 168 can be used to determine who is responsible for reviews and tests of the various development components, who has responsibility for configuration management and change control, and who has responsibility for defect control and corrective action. For smaller projects, this responsibility may be spread across the individual developers or teams; on larger projects, responsibility may be assigned to a specific quality team that interacts with the individual development teams.

The quality function development tools 168 are also used to reveal, document, and prioritize the requirements for systems and applications under development that are to be deployed on the data warehouse computing system 20. Based on these requirements, it is possible to define meaningful goals for product quality along different dimensions (e.g., maintainability, complexity, and performance).

The measurement and metrics tools 170 are an important part of the quality management tools 66 because they provide operational definitions of quality attributes. These applications or functions provide an operational definition for a method of sampling, testing, and determining whether a work product meets a given criterion. With the operational definitions, different users can use the measurement and metrics tools 170 to agree that a product objectively meets a requirement, or that a process has been improved by a measurable amount. To fine-tune the development process, it is necessary to be able to measure the important quality attributes. These measurements will evolve as software engineering matures and the data warehouse computing system 20 expands, but sample items that the preferred measurement and metrics tools 170 monitor include: the average number of defects per design packet at the moment construction starts; the average number of defects per program at the time of its first migration to product test; system availability and causes of downtime in the data warehouse computing system 20; time needed for a new developer to learn to use a function of the data warehouse computing system 20; developer error rates per function; and maintainability in terms of time to fix a defect or to add new functions to the data warehouse computing system 20.

For the measurement and metrics tools 170 to capture this information, the tools or applications used to perform a function must provide support for capture of quality statistics. For example, the source code management toolset can allow information to be specified about reasons for a change, and the stage the component had reached (e.g., initial construction, product test, and production). This information could be stored and placed in a quality statistics part of the development repository for later reporting.

The statistical process control tools 172 monitor and relate to the methodology, work flow, and tools usage in the data warehouse computing system 20. As such, the statistical process control tools 172 ensure that quality gets built into the end product from the beginning of development. The applications that are designed for the statistical process control tools 172 preferentially implement standards and procedures pertaining to quality assurance of the process, describe how to use simple tools, such as templates and checklists, and document the mandatory outputs from each work process. Other procedures applications can perform include common tasks such as design reviews and code reviews.

The continuous improvement tools 174 include applications that capture feedback on the quality process and can take actions to improve it or notify individual end-users 24, by e-mail for example, if necessary. The continuous improvement tools 174 also preferentially include applications that can create an electronic suggestion mailbox to receive suggestions from various end-users 24, employees, as well as public users of the data warehouse computing system 20. Those skilled in the art of programming would recognize that the continuous improvement tools of the quality management tools 66 may be used in various applications.

The preferred development architecture 50 also includes system building tools 68, as illustrated in FIG. 5. The system building tools 68 comprise the core of the development architecture 50 and are used to design, build and test the overall functionality of the data warehouse computing system 20. As such, the systems building tools 68 are an important part of the development architecture 50. The system building tools 68 include applications that are used by the development team to capture the system requirements, the functional design, the detailed design decisions, the detailed coding and testing and to manage the resulting (frequently large number) components of the data warehouse computing system 20.

Figure 10:
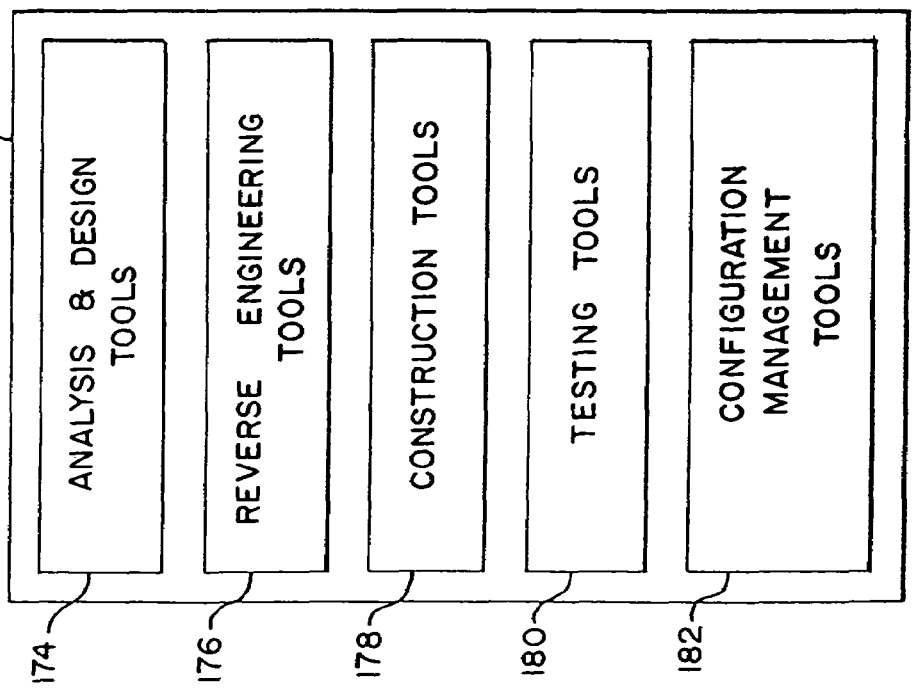
FIG. 10 is a schematic representation of system building tools for a development architecture, in accordance with one embodiment.

Referring to FIG. 10, the preferred system building tools 68 may be selected from the group consisting of analysis and design tools 174; reverse engineering tools 176; construction tools 178; testing tools 180; and configuration management tools 182. The system building tools 68 are the core of the development architecture 50 and are used to design, build, maintain and monitor applications used on the data warehouse computing system 20. The analysis and design tools 174 are used to capture the requirements for the application being developed, to analyze and prioritize them, and to transform them into a functional definition and then into a detailed technical definition suitable for construction. In other words, the analysis and design tools 174 help specify "what" a system needs to do, and design tools help specify "how" a system will implement the "what." In the preferred embodiment of the present invention, the analysis and design tools 174 may be selected from the group consisting of data modeling tools, process modeling tools, database design tools, application logic design tools, presentation design and modeling tools, communication design tools, performance modeling tools and object and component modeling tools. The data modeling tools provide the capability to graphically depict the logical data requirements for the system on the clients 26. Typically, a tool for data modeling supports diagramming entities, relationships, and attributes of the business being modeled on an entity-relationship diagram (ERD).

The process modeling tools provide the capability to depict (preferably graphically on the clients 26) the business functions and processes being supported by a system of the data warehouse computing system 20, including, for example, tools that support documenting process decomposition, data flow, and process dependency information. As with the data modeling tools, the main difference in these tools for data warehouse computing system 20 is the ability to capture the information necessary to make process placement decisions. For example, where the process needs to occur (on a mobile personal computer, on a personal digital assistant, at a stationary workstation), the type and volume of data it requires to perform the function, and the type of function (user interaction, reporting, batch processing).

The database design tools provide developers with the capability to capture the database design for the data warehouse computing system 20. The database design tools enable the developer to illustrate, for example, the tables and file structures that will be physically implemented from the logical data requirements. The database design tools also capture the definition of data elements, indexing decisions, foreign keys and referential integrity rules. The application logic design tools provide developers with the capability to depict the logic of the application, including application structure, module descriptions, and distribution of function across various nodes of the data warehouse computing system 20. A variety of tools and techniques can be used for application logic design, including structure charts, procedure diagrams (module action diagrams), and graphics packages to illustrate distribution of function across the data warehouse computing system 20.

The presentation design and prototyping tools provide developers with the capability to depict the presentation layer of a particular application, including screens, windows, reports, and dialog flow. Tools in this category include report painters, ad hoc query tools, online analytical processing (OLAP) tools and executive information systems (EIS).

Report painters let the developer use clients 26 to design the report layout interactively, placing literals and application data on the layout without specifying implementation details such as page breaks. Typical report painters also generate the associated application code or a structure in which remaining code can be placed during construction. In addition, many window painters provide the capability to rapidly prototype user interfaces.

Ad hoc query tools allow developers to prototype various approaches for accessing, combining and summarizing data that may be needed by future end-users 24.

OLAP tools allow developers to prototype various ways of combining and presenting information in much more sophisticated ways than provided by ad hoc query tools.

EIS tools allow developers to prototype various ways of presenting information to executives using very high quality graphics and presentation methods.

Prototyping tools allow developers to follow a more iterative functional design approach, which is important when dealing with developers and users that may be new to the GUIs typical of data warehouse computing systems. In addition, given the responsive nature of a GUI, prototyping becomes an effective way of clearly communicating how the system appears to the end-user 24, by allowing developers to view and interact with applications before final implementation. Another aspect the prototyping tools provide is enabling developers to rapidly build and modify screens and windows. Examples of prototyping tools include Sybase's SQR, Crystal Reports by Seagate, Business Objects from Business Objects, Impromptu and Powerplay from Cognos, Brio Query from Brio, and DSS Web from Microstrategy.

The communication design tools allow designers to specify the contents of an exchange and define the "contract" of the exchange in terms of the processing to be performed, the expected preconditions, and the handling of error or unexpected conditions. The communication design tools can also provide a generation capability for the code or common structures required in construction to send and receive the message. After the fundamental communication paradigms have been chosen (message passing, remote procedure call, structured query language-based), each exchange must be specified in detail to take into account the detailed design of the sending and receiving modules (clients 26, services, subroutines, functions) and to lay the basis for more refined performance modeling. Multiple tier data warehouse computing systems 20 can only be built efficiently if the interfaces between the tiers are precisely specified.

The performance modeling tools support the analysis of the system performance of the data warehouse computing system 20. An application that generates a simple spreadsheet may be suitable in some well-known and understood environments, but dedicated performance or simulation modeling applications are preferentially used for any applications with high transaction volumes or complex multi-tier architectures involving several platforms.

In data warehouse computing systems 20, the performance of the network is often critical. However, it is impossible to guarantee the performance of an application once it has passed by an ISP (Internet Service Provider) over an Internet connection to the clients 26. Therefore, the preferred performance modeling tool is also able to model the performance to the ISP, as well as provide the ability to do "what-if" scenarios for the network design and security implications.

The object and component modeling tools provide specific applications for creating object and component models that can be used to automate the component design process, as well as create and document the component model. Some of these tools are also capable of generating code.

As previously set forth, the system building tools 68 may include a reverse engineering tool 176. The preferred reverse engineering tool 176 may be selected from the group consisting of a system structure analysis tool, an extraction tool, a repository population tool and a restructuring tool. As known in the art, reverse engineering is a set of techniques used to assist in reusing existing system components-either directly (e.g., code/modules) or indirectly (e.g., design rules or algorithms, and record layouts) on the creation of new applications. The reverse engineering tools 176 are used to streamline the development process. Although the reverse engineering tools 176 cannot completely automate the analysis process, they can reduce the amount of manual effort needed, and significantly lessen the amount of non-value-added automatic activities such as "find all the places in a program that affect the value of a given variable."

The reverse engineering tools 176 may include a system structure analysis tool that is used by a developer to identify requirements for a new system from the capability and design of a legacy system. These applications enable the developer to interactively and graphically navigate through the legacy system, analyzing such system characteristics as system structure, module flow, flow of control within a module, calling patterns, complexity, and data and variable usage.

The system structure analysis tools can also provide cross-reference listings or graphical representations of control or data flows to users on clients 26. These tools are most effective when they are used to find and understand the business rules implemented by a system (that may no longer be documented) to provide comparable features in a new system. Examples include VIA Insight, VIA Renaissance, and Compuware PATHVU.

Referring to FIG. 10, the construction tools 178 of the system building tools 68 are used to program, or build, applications, client 26 and server 16 source code, windows or screens, reports, and databases. Sophisticated tools to support the rapid creation of client/server systems and data warehouse systems are readily available. These visual programming tools (e.g. Cognos Powerplay or Microstrategy's DSS Agent) simplify the creation of 2-tier client/server systems by providing tools and languages geared towards user interface development while also providing graphical controls that link directly to relational data sources.

The construction tools 178 are preferentially selected from the group consisting of extraction tools, repository population tools, source code editor tools, generation tools, and compiler/linker/interpreter/debugger tools.

The preferred construction tools 178 also include an extraction tool. The extraction tool, in conjunction with a repository population tool, provides the developer with the capability to extract data from a legacy system. The preferred extraction tool employed in the data warehouse computing system 20 will read and extract information from legacy files and databases. The most common information the extraction tools extract from a legacy system is data: record or table structure, indexes, and data element definitions. In addition, the tool supports the cleansing and transformation of data under rules stored in the tool. Example extraction tools that could be used include ETI's Extract, Informatica's PowerCenter pr Informix's Ardent DataStage.

The preferred construction tools also include a repository population tool. The repository population tools load the information from the extraction tools and the structure analysis tools into a development repository, which is preferentially located on a respective server 16. These tools convert the information from the legacy system into the syntax of the development repository of the system building tools 68.

The source code editor tools are used to enter and edit source code for a particular application. Typically, editors are provided by an integrated development editor (IDE), but many IDEs allow editors to be replaced by popular and more powerful editors such as Brief. Most editors provide source highlighting and integration with online help systems. Within the IDE, the editor is coupled to the compiler to provide incremental syntax checking, rapid compilation, and the ability to run and test the application without having to leave the editing environment (e.g., C++ development environments from Borland, Microsoft, and IBM).

The generation tools are automated tools that generate some component of the application: source code, common structures, windows, reports, and the database definition. These applications convert the application design into some form of source code. Some common types of generation tools include procedural code generator tools, shell generation tools, and data design language and data manipulation language generator tools. Some extraction tools like ETI's Extract are also generation tools.

The procedural code generator, also known as source code generators, take a pseudo-code specification of a module and generate a module in the appropriate programming language. Alternatively, the procedural code may be specified in the development repository using the target programming language (this eliminates an additional language that would have to be learned by a developer).

Shell generation tools are used when it is not feasible or desirable to specify detailed code within the development repository. As such, a shell of a module can be generated with the shell generation tools with markers for where module specific code should be entered by a programmer. These markers are frequently encountered in window painting tools that can generate the modules required to implement the window with all the housekeeping code already in place. Visual C++ from Microsoft is an example of a tool that offers such a capability—it generates the shell code for windows painted in the environment and allows the programmer to add the business logic at specified drop points.

Data design language (DDL) and data manipulation language (DML) generator. Based on the data and access definitions specified in the repository, these would generate the schema definition for the appropriate DBMS, and the structured query language (SQL) and support code for performing the database I/O. DML generators are either custom-developed for a project or may be built on top of general-purpose query tools (such as Q&E or report writers). In the latter case, the query tool is used to build the query and the resulting SQL is copied into the appropriate module.

Compiler/linker/interpreter/debugger tools are usually part of an IDE—it is rare today to be able to purchase a standalone compiler (the exceptions are midrange and mainframe platforms, although products such as IBM's Visual Age are also becoming popular on these platforms).

A compiler/linker converts source code to executable code and packages it into a runtime module. Third-generation languages such as C, C++ and COBOL are all compiled languages. An interpreter executes the source code directly (or indirectly through a pseudo-compiled intermediate representation). Java and Visual Basic are the best known interpreted languages, although the latest versions can also be compiled.

A source code debugger (sometimes known as a symbolic debugger) is used to step through a program or module at the source code level (as opposed to the machine code level). Although commonly used for debugging programs, source code debuggers are also effective in supporting component testing, because variables can be changed to cause logic to be executed that might otherwise be difficult to simulate using external data (e.g., time sensitive logic, logic for handling I/O hardware failures). Debuggers are typically included in an IDE.

The system building tools 68 also preferentially include a testing tool 180. Testing is the process of validating that the gathering and transformation of information has been completed correctly and to the expected quality level. Testing is usually considered the process that makes sure there are no bugs in the code. But in a broader sense, testing is about making sure that the data warehouse computing system 20 does what it is expected to do (i.e., meets the requirements specifications) at an acceptable quality level (e.g., acceptable numbers of defects per function point, or defects per module). Those skilled in the art would recognize that various testing tools 180 may be designed and used in the present invention, depending on the needs and requirements of each data warehouse computing system 20.

The preferred testing tools 180 include stubs and drivers that are used to test various components of an application or architecture before a complete set of components is available. These are generally custom-coded as part of the component testing effort. Stubs emulate subroutines or external functions in a minimal fashion—that is, they basically return with some sample data and the various return code values (e.g., successful and failed). They are useful for testing a module when the modules it calls are not yet ready or available for testing. Harnesses and drivers call up a module and emulate the context in which the module will be called in the production environment.

As previously set forth, the preferred system building tools 68 also include configuration management tools 182. The configuration management tools 182 handle the management of components in the data warehouse computing system 20 to ensure that the components collectively satisfy the given requirements of the data warehouse computing system 20. "Configuration" designates a set of components in a given environment satisfying certain requirements. The configuration management tools 182 ensure that consistency is maintained over time, even with changes to the components. The components of the data warehouse computing system 20 are typically hardware, system software, and application components (such as source code, executable modules, load libraries, database DDL, and scripts or job control language), together with their documentation. The development architecture 50 also includes test data, test scripts, and other components that must be aligned with a given version of the configuration.

Version control and compatibility of components are key considerations when managing components of a data warehouse computing system 20. Version control applies to all types of components, not just application components. In case incompatibilities are discovered, it must always be possible to "roll back" to a previous consistent state—that is, to revert to an earlier version of one of more components. To do this, it is necessary to know which versions are compatible. It must be possible to define releases of a configuration—a list of version numbers, one for each component, which together form a consistent configuration. The configuration management tools 182 provide this functionality to ensure proper versions of applications are being executed on the data warehouse computing system 20.

In the preferred embodiment, the configuration management tools 182 for the development architecture 50 preferably include version control tools and migration control tools. Version control tools control access to source code and other development components as they are developed and tested in the data warehouse computing system 20. They typically allow releases to be defined and multiple "snapshots" (i.e., the versions of all the components in the release) to be taken and maintained to facilitate rolling back to earlier releases if necessary. Examples of version control tools include Intersolv's PVCS and the UNIX Source Code Control System (SCCS).

Migration control tools control multiple versions of source code, data, and other items as they are moved across different environments of the data warehouse computing system 20. The source code migration control tools manage multiple versions of source code to ensure that changes are applied in the proper environment and that thoroughly tested modules are subsequently migrated to the next environment. Data migration control tools manage multiple versions of the database and its data to ensure that accurate data and structure are maintained in the environment and that versions of application code and database are deployed consistently. Types of data that would be migrated include base codes data or other reference data (e.g., a state code table or valid order code table) and converted business data. Other migration control tools manage other types of system objects to ensure that a complete version of all components reside in the production environment (e.g., architecture support files, test definitions, and scripts).

In one preferred embodiment, development architecture 50 includes environment management tools 70. The environment management tools 70 monitor performance, provide help desk support, manage and distribute changes to the development architecture 50, administer the environment and track and plan capacity. Adopting a structured approach to environment management, applying the same principles to development as to production, has several advantages. It provides high-quality support for developers. In addition, environment management tools 70 can provide significant experience with the operations management tools in an environment that is generally smaller and carries lower risk than the full production environment. Environment management tools 70 facilitate the tuning of the production support approach before production roll-out. The approach is refined from experiences using it to support the development team.

Figure 11:
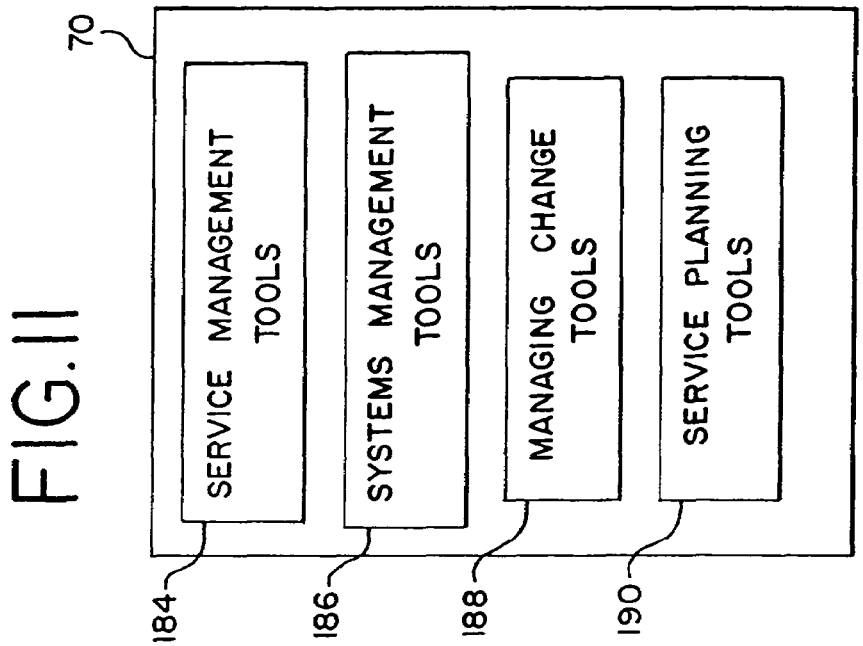
FIG. 11 is a schematic representation of environment management tools for a development architecture, in accordance with one embodiment.

Referring to FIG. 11, in one preferred embodiment, environment management tools 70 include service management tools 184, system management tools 186, managing change tools 188 and service planning tools 190. The environment management tools 70 support different functional and technical requirements of development teams, and include tools that support the various stages of the lifecycle of an application used in the data warehouse computing system 20. The service management tools 184 define and manage to an agreed-on level of service, including service-level agreements, information gathering to check against the service-level agreements, and help desk support for the developer community. The system management tools 186 manage the development architecture 50. These tools provide support for managing security, starting up and shutting down the development architecture 50, and performing backups of files and applications. The managing change tools 188 are used for making, tracking, and distributing changes to the development architecture 50.

The most common type of change is upgrading of software (system, architecture, or application), but changes to hardware configurations and network configurations must also be supported. The service planning tools 190 support a capacity planning function for the development architecture 50. The environment needs to be monitored and sufficient lead time allowed to support required capacity changes for shared disk space, server size (e.g., central processing unit size, memory, and number of users), network, and workstations (either the number of workstations or the configuration of the workstations). Hardware resource sizing for CPU, memory, disk and network is a critical component to any data warehouse computing system 20. Hardware is one of the largest expenses within a large data warehouse computing system 20, given the multiple hardware servers and potentially hundreds of gigabytes or even terabytes worth of data that must be supported. This issue tends to get high visibility at executive levels given the cost and impact on the bottom line. Sizing must be performed for hardware for development, testing and production. Sizing must occur early enough to procure and install the hardware in time to meet development, testing and release timelines. New servers and disks and how these are configured generally command the most time and attention. Sizing must also occur with the bottom line cost impact in mind. If the organization can not afford or support the hardware necessary to meet requirements, scope or user expectations regarding performance and availability might have to change.

Referring to FIG. 12, the program and project management tools 72 provide many key features that assist project planners in planning, scheduling, tracking and reporting on project segments, tasks and milestones. In the preferred embodiment of the present invention, the program and project management tools 72 are differentiated by the ability to support multiple projects, complex functions and adequate performance when supporting multiple concurrent projects. The presently preferred program and project management tools 72 may be selected from the group consisting of planning tools 192, scheduling tools 194, tracking tools 196 and reporting tools 198. Those skilled in the art would recognize that depending on the enterprise's operations, the programming and project management tools 72 may vary from enterprise to enterprise.

The planning tools 192 are tightly linked with the development methodology. The planning tools 192 help in estimating the development effort, defining the project tasks and activities, and identifying the type and quantity of resources required (subject matter experts, architects, designers). When the planning tools 192 have determined estimates and resource requirements, the scheduling tools 194 assist in scheduling the work, identifying dependencies and critical paths, and balancing (level loading) the work across the resources. On an ongoing basis, the scheduling tools 194 also provide administration features that allow tasks to be assigned and reassigned as the project evolves.

The tracking tools 196 provide a mechanism for members of the development team to report time against a particular project plan. This is typically done on a weekly or biweekly basis. The reporting tools 198 provide reporting capabilities to reflect the status of the project against the plan. In the simplest form, the reporting consists of budget and schedule information, such as time spent by member, budget variance, schedule variance, estimates to complete, and planned versus actual results. More advanced tools can provide information on productivity and efficiency. Most project planning and management tools 72 available today provide some capability for each of the above. Examples of these tools include Microsoft Project and ABT Project Manager's Workbench.

The team productivity tools 74 are used to make the work cell and project team as a whole more productive within the enterprise, as illustrated in FIG. 13. Instead of the software residing on the client 26, the team productivity tools 74 are typically LAN-based and shared by the project members on clients 26. As such, the team productivity tools 74 are typically located on the servers 16. In the preferred embodiment of the present invention, the team productivity tools 74 are focused on enhancing communication and information sharing within the business enterprise and may be selected from the group consisting of E-mail tools 200, teamware tools 202, publishing tools 204, group calendar tools 206, and methodology browsing tools 208. Those skilled in the art would recognize that several other team productivity tools 74 may be incorporated into the data warehouse computing system 20.

An E-mail tool 200 (e.g., Lotus Notes, or Microsoft Exchange) is valuable for sharing such dynamic information as design documents, meeting schedules, project events, data, and resource availability. Because E-mail tools 200 allow mail to be stored, forwarded, sorted, and filtered dynamically, they improve the quality of communication; they also speed up the flow of information between users.

Those skilled in the art would recognize that several E-mail tools 200 may be used in the present invention.

Teamware tools 202 allow groups of people to share information easily. The teamware tools 202 typically provide a forum for people with a common interest to share information and ask questions of one another. Depending on the desired environment, the teamware tools 202 forums may include newsgroups, bulletin boards, or databases. What they have in common is the ability to post questions and comments and to search through the existing discussion to see whether the information required is already present. Like E-mail tools 200, the posting and reading of information takes on the look of a mail letter. Unlike E-mail tools 200, however, the "letters" are openly available to everyone with access to the bulletin board and are saved for an extended period of time.

The publishing tools 204 allow individuals to create and print anything from single deliverables or specs all the way through the complete set of documentation for the system. Because documentation may be spread over several hardware platforms, and because it may reside in different libraries in different formats and may have to be printed using different tools, it is important to ensure that any chosen publishing tools 204 can inter-operate or integrate to allow aspects such as common headers and footers and consecutive page numbering to be handled without overly intensive manual involvement.

The preferred team productivity tools 74 also include group calendar tools 206 that are used for scheduling purposes and routine calendar tasks. These tools allow users to schedule important items, generate reminders of deadlines, and various other functions, commonly provided in group calendar tools 206. Those skilled in the art would recognize that various group calendar tools 206 may be used in the preferred development architecture 50 for the data warehouse computing system 20.

The methodology browsing tools 208 are used in the team productivity tools 74 to allow users to browse, from clients 26, various types of documents and files located on the data warehouse computing system 20 that are associated with the project methodology. For instance, viewing the overall development lifecycle, descriptions of specific tasks and deliverables, task considerations and other tasks that are related or dependent.

Referring to FIG. 14, the information management tools 76 include a development repository 214, a folder management tool 210 and a repository management tool 212. In one preferred embodiment of the present invention, the information and data for applications is stored in the development repository 214 on such devices as hard drives, CD-ROMS, and magnetic tapes. However, those skilled in the art would recognize that various other storage devices may be used as well.

The information management tools 76 share a common repository of development objects, design documents, source code, and test plans and data in the development repository 214. Ideally, the development repository 214 would be a single database with an all-encompassing information model. The development repository 214 is built by integrating the repositories of the different development tools through various interfaces. Specific tool vendors may also build part of the integrated repository by integrating specific products.

The preferred development architecture 50 also includes a development repository 214. The development repository 214 is the communication backbone of the development architecture 50, making it easy to share information between people working on different processes. The development repository 214 stores design, construction, and maintenance information, such as window layouts, processing specifications, code fragments, and references to source code files. By storing this information in the development repository 214, several benefits can be realized in the development architecture 50.

The use of the development repository 214 is made an integral part of designers' and developers' daily activities. The development repository 214 is a tool that assists the team, but even simple development repositories 214, such as a well-36 managed set of shared directories on a network server 16 can provide significant benefits. The key to success is ensuring that the development repository 214 is at the heart of the development processes, remaining intact and populated with current information.

By providing a common "template" for the content and format of design information, developers can create consistent specifications. In addition, by providing a "pool" of common definitions (especially for such low-level objects as data elements, table/record definitions, windows, and reports), the development repository 214 facilitates consistent use and interpretation and, in some cases, reuse.

For example, by providing a common place for element definitions, and including such display information as literals and field size, windows and reports are more likely to integrate with the database definition and more likely to display or interact with the end user in a consistent manner (field validation, the literal to the left of the field, the length of the field). Without this information in the development repository 214, it would be up to individual developers to seek out the "common" information and apply it appropriately while they define their windows and reports. Consistent capture and organization of information makes it much easier for more automation (e.g. code generators) to be provided in the future.

The development repository 214 cannot force reuse to occur, but it is a building block on which to start a program of reuse. Because information about low-level (elements) and high-level (functions, subsystems) entities is stored in the development repository 214, it is a logical place to begin looking for reusable building blocks for developers. This reuse commonly happens within a team on a project but can also happen across teams within a project and eventually across projects.

The folder management tools 210 allow users to manage documents and files within the development repository 214 of the information management tools 76. In addition, the repository management tools 212 monitor and manage the contents of the development repository 214. Those skilled in the art would recognize that the exact functions of the folder management tools 210 and the repository management tools 212 will vary, depending on the needs of each particular data warehouse computing system 20.

For other features, advantages and combinations of the present invention refer to U.S. provisional application Ser. No. 60/176,962, which is herein incorporated by reference in its entirety.

FIG. 6 illustrates the end-user access architecture 110 of data warehouse computing system 20. End-user access architecture 110 supports the delivery of data from the data warehouse architecture 40 to the end-user 24 via an end-user access component 112. The end-user access component 112 determines much of what the end-user access architecture 110 supports, so the end-user access architecture 112 should only be defined after the following questions are answered: 1) what types of reporting and analysis is required by end-users; 2) what degree of availability to the data is required by users; 3) what degree of data detail and data timeliness is required; 4) how should data be placed throughout the architecture to meet user performance and availability requirements; 5) should data be located centrally, regionally and/or on the user machine; 6) what mechanisms are required to deliver information to the users (i.e., web-based tools, hard-copy printouts, faxes, pager, etc.); 7) what level of security is required to access the data; 8) what kind of end-user access components 112 meet these requirements; and 9) what are the architectures that these end-user access components 112 impose upon the data warehouse environment.

End-user access components 112 will provide the various reporting, analytical and discovery capabilities necessary for users to gain benefit from the data warehouse computing system 20. End-user access components 112 should be chosen with a deep knowledge of end-user 24 reporting and operational needs, as the end-user access components 112 will heavily influence, if not completely dictate, the end-user access architecture 110.

End-user access components 112 include report writer tool 114, query tool 116, analytical tool 118, and knowledge discovery tool 120. Report writer tool 114 generates canned, pre-generated reports. Query tool 116 generates ad-hoc queries with no or beginner knowledge of SQL required, in a user-friendly and graphic environment. Analytical tool 118 provides fast and flexible views of data, including roll-ups, drill-downs, ranking, averaging, and trending over time. Knowledge discovery tool 120 utilizes intelligent data mining and statistical techniques to find previously unknown patterns in large amounts of data. End-user access components 112 provide the mechanisms and architecture to access and display data in an understandable and flexible manner to the end-user 24. Some end-user access components 112 provide additional storage capabilities, such as providing highly-indexed databases or other structures, as found in a data mart 42, for fast and efficient access. Data can be stored on the client 26, or as a centralized or distributed component of the data warehouse computing system 20, depending on the capabilities and architecture of the end-user access component 112.

FIG. 7 illustrates metadata management 130 of data warehouse computing system 20. Metadata management 130 incorporates the collection and publication of information about the data itself, that is, both the business meaning and the technical characteristics of the data. Metadata management 130 is not any one data store, process or architecture. Metadata management 130 has components of a data store, a process, and an architecture, and is dependent on the other components within the data warehouse computing system 20. Because metadata exists within practically every component of the data warehouse architecture 40, metadata needs to be actively managed to be properly defined, collected and utilized.

Metadata is often defined as 'data about data'. Typical examples of metadata include file structure definitions, database field names, lengths and standards found in a data model, as well as calculations and formulas found in any field-to-field or field-to-report mappings. Data warehousing architecture 40 adds new metadata categories generally ignored or not tracked in the past, and adds stronger emphasis to metadata as being a key contributor to the success of the data warehouse computing system 20.

Metadata management 130 includes the storage of metadata in a metadata repository 134, as well as the management of business metadata 136 and technical metadata 132, as illustrated in FIG. 7. The metadata repository 134 may be a bespoke repository residing on a relational database management system, or it may be a proprietary repository provided by one of the many data warehouse tools vendors, and may use proprietary file structures to store the metadata. Business metadata 136 is the process that defines and manages the information needed by end-users 24 to be confident in the meaning, quality and timeliness of the data. Without this kind of information, the most technically robust and high-performing data warehouse computing system 20 will not be used to its fullest potential. Business metadata 136 includes things such as business rules describing what is and is not included within the data warehouse component 44, definitions of business hierarchies and KPIs, common business definitions and calculations for data elements, transformation and conversion rules in business context, source system names and locations, and end-user security profiles. Technical metadata 132 is the process that defines and manages the data used by the IT support organization to ensure that the data is valid, timely and accurately reflects what is being pulled from the source systems. Technical metadata 132 is also used for change control, to ease the impact analysis and development effort for future modifications and enhancements to the data warehousing architecture 40. Technical metadata 132 includes things such as data warehouse field lengths and definitions; field-to-field mappings between source and target; query response times; usage of queries and aggregation tables; timings of loads, updates, and archives into and out of the data warehouse; and timings and verifications of success for batch file transfers.

Metadata management 130 consists of the processes that perform the definition, collection, controls and publication of appropriate metadata to the right people at the right time. Determining what kind of metadata should be captured, how it should be published, and what degree of integration is necessary are all part of this process. Metadata resides in multiple places throughout the architecture. It exists within the DBMS tool, the ETL processes and tools, the end-user access tool, as well as any tools or custom programs specifically utilized to collect and capture this information into a single place.

There is little way of 'taming ' this large amount of metadata without a manageable process behind it. The lack of metadata management 130 may lead to metadata that is ignored, over-engineered, over-simplified and/or published in a difficult-to-understand format. This in turn could detract from the quality and usefulness of the data warehouse component 44 as a whole.

Before determining the overall collection strategy for metadata, the development team must assess metadata requirements. This is not straightforward, as typical business sponsors and end-users 24 do not generally think in these terms. It is the development team's responsibility to define and determine the scope and importance of metadata to be collected before a strategy is put into place. Phrasing these requirements in terms the client understands or has used in prior metadata collection efforts for legacy systems can be useful in creating and prioritizing this list. It is then the development team's responsibility to assign roles and responsibilities in the implementation, ownership and maintenance of the metadata. If the requirements step is ignored, as it often can be, metadata collection will likely occur in a manner that is ad-hoc, minimal, non-integrated, low-tech (i.e. manual spreadsheets instead of automated procedures), and potentially, low-value.

Metadata needs to be defined, stored and accessed in a comprehensive manner, just like the data in the data warehouse component 44. The approach to storage and access constitutes the metadata collection strategy. A metadata collection strategy has the following attributes: 1) Integrated vs. Non-Integrated; 3) Centralized vs. Distributed; and 3) Automated vs. Manual. It is up to the project developers and end-users 24 to determine the breadth and degree of automation, centralization and integration required by the project to capture and publish this metadata. There is no one 'right' way or 'best' way to do this, as it will vary greatly on project needs and constraints.

Metadata collection strategies typically consist of one or a combination of the following: 1) metadata repositories; 2) decentralized metadata capture; and 3) manual metadata collection techniques. Metadata repositories are utilized to integrate disparate metadata from multiple sources (tools, databases and processes) via automated feeds into a single point of collection. A number of metadata management tools are available on the market, but no one tool is sufficient for all requirements. This is primarily due to the sheer complexity of metadata management issues, but is also a result of a lack of common standards defining common metadata needs, terms and syntax. The use of an integrated metadata repository does not frequently occur for smaller-scale or tightly budgeted projects, due to cost, complexity and requirements not being strong enough to support this complexity. In this case metadata will be captured in a decentralized manner, within the tools, processes and utilities that are built or bought for the data warehouse architecture 40. However, the metadata will exist in individual silos, out of context of other processes. These individual silos will likely not be integrated with each other in any fashion 'out of the box' unless the tools are part of a framework specifically designed for metadata standards across multiple tools. Common metadata standards and frameworks, while still in their infancy, have been gaining popularity over recent years.

In the meantime, automated or manual processes can be custom-built to capture the key metadata out of database management system 32, the ETL processes and tools, and the end-user access components 112. Automated processes to gather and centralize metadata in this fashion can be time-consuming to build, and rarely has the business case supporting the cost involved. This is why the majority of projects today still go with manual metadata collection. Even if centralized and automated methods of metadata collection can not be utilized on a project, there are still high-benefit but manual-intensive methods of gathering and publishing metadata. Unsophisticated and potentially manual-intensive metadata collection and publication is often of high-value, and at least is better than nothing at all.

Referring to FIG. 8, the operations architecture 78 includes the tools and support services required to keep the data warehouse computing system 20 up and running well. The preferred operations architecture 78 supports a data warehouse architecture 40 and a development architecture 50 that are located on the data warehouse computing system 20. The operations architecture 78 differs from the data warehouse architecture 40 and the development architecture 50 in that the operations architecture's 78 primary users are systems administrators and production support personnel. In addition, the operations architecture 78 differs from the operations infrastructure in that the operations infrastructure represents operations processes and organization as well as the technologies and tools.

As illustrated in FIG. 8, the preferred operations architecture 78 includes a wide variety of tool categories. Tool categories cover the spectrum of functions provided by the operations architecture 78, which range from software distribution tools 80 to help desk tools 104, as set forth in more detail below. The preferred operations tools in the operations architecture 78 include a software distribution tool 80, a configuration and asset management tool 82, a fault management and recovery management tool 84, a capacity planning tool 86, a performance management tool 88, a license management tool 90, a remote management tool 92, a event management tool 94, a systems monitoring and tuning tool 96, a security tool 98, a user administration tool 100, a production control application set 102 and a help desk tool 104.

The tools set forth above provide visibility and control over the events of a distributed environment, which is how data warehouse computing system 20 operates. In essence, they can be viewed as the support and control mechanisms for both the data warehouse architecture 40 and the development architectures 50. In the preferred embodiment, the software distribution tools 80 provide automated delivery to, and installation of, applications and systems software on the servers 16 and end user devices (e.g., clients 26, kiosks, etc.). This can be for an organization's internal computing environment, as well as for its extended one, i.e., its business partners and customers. The architectural support required to support the operations architecture 78 software distribution is largely driven by the number of clients 26, servers 16, and the geographic locations to be served.

When it is unrealistic to use a manual approach to software distribution, an organization should consider adding automated software distribution tools 80 to the operations architecture 10. Many products from leading vendors such as Microsoft, Tivoli, and Hewlett-Packard are on the market today that include or specialize in automated software distribution. Systems developers must look for several important features, depending on the specific support requirements of the data warehouse computing system 20.

The server 16 component of a preferred software distribution tool 80 enables administrators to build distribution packages and to control distribution amongst the data warehouse computing system 20. A distribution is a package of related software files, data, and installation scripts that form an installable unit. Few significant application installations, systems software installations, or even upgrades can be achieved simply by sending a single file. Configuration files (e.g., config.sys) and system files (e.g., autoexec.bat, login as well as multiple software files for a particular application or systems software component, often require changes. In addition, it is usually desirable to upgrade multiple applications or combinations of systems software and applications in a single distribution rather than performing multiple independent software distributions. Bundling software upgrades together also reduces the amount of release testing required.

A distribution is created by selecting the files and scripts, often through a point-and-click interface on the client 26 or servers 16, depending on what system is being upgraded. The components are then combined into a single file for transmission to the respective devices. Some software distribution tools 80 might provide compression capabilities to reduce the physical size of the distribution. This is particularly important in a WAN environment where line speeds are an issue.

There are multiple approaches to scheduling software distributions. Some solutions use a rigid scheduling mechanism that requires all target machines (i.e., clients 26 or servers 16) to be powered on at a specified time when the software distribution is to occur. This mechanism could be characterized as a "push" strategy, where the server 16 performing the software distribution pushes the application to the client 26 or servers 16 at a specified time.

A more flexible approach is a pull strategy, where the clients 26 or servers 16 check for software updates and pull the software from the designated servers 16 at log-in time. Thus, when the end-user 24 signs on either in the morning or at some point during the day, any pending updates are downloaded to the respective clients 26 or servers 16. When combined with a forced log-off capability, which most networks support, this can effectively mimic the push strategy without the attending problem of some machines being powered off.

Neither the push nor pull scheduling approach is sufficient when large numbers of target clients 26 are involved. Faced with the problem of scale, two alternatives can be used when performing a software distribution on a large scale. One is simply to acquire more servers 16 with more copies of the software to be distributed. Of course, this is an expensive solution, particularly when these machines are not needed for any other purpose. The preferred solution provided by the software distribution tools 80 involves staging software distribution. Software distribution staging works by sending a new version of the software in advance of the cut-over date. In effect, the clients 26 or servers 16 have two versions of the application physically resident simultaneously, but only one is in use. The existing software is used until the present cut-over date is reached. At that time, the clients 26 portion of the software distribution tool 80 automatically completes the installation and redirects the user to the new version. Using this approach, it is possible to selectively download the software update to subsets of machines well in advance of the cut-over date, thus eliminating the bottleneck.

An enhancement of staging is the ability to cut over to the new version on the receipt of a small command file rather than a preset date. This gives operations more flexibility to alter the cut-over date due to unanticipated events. For example, many adopters fail to anticipate the requirements of having multiple copies of applications stored simultaneously when determining the size of the workstation hard disks required for the users.

In one embodiment, software distribution tools 80 used in the operations architecture 78 include a client 26 portion as well as a server 16 portion that resides on the target machine. The client 26 software is responsible for installation of the software distribution onto the target machine's hard disk. The first step in the installation process is the unbundling (and uncompressing) of the software distribution into the component files, data sets, and scripts (although the better products will first check to see that the required disk space is in fact available). Next, any pre-installation scripts are executed. These scripts may do such various tasks as checking for required components or adding or modifying lines in the target machine configuration or systems files that will be required by the new software (e.g., changing the number of buffers or adding a line to install a necessary driver at startup time). The directories in which the software is to reside are checked or created, and then the actual software files are moved into the proper location on the hard disk. At this point a post-installation script may be invoked that could include rebooting the machine so that the changes to the system and configuration files can take effect.

Another aspect of the software distribution tool 80 is that it supports error handling reporting. When dealing with larger networks of clients 26, errors inevitably occur in the software distribution process. There may be insufficient disk space or a required component may be missing. The preferred software distribution tool 80 is capable of reporting errors and taking appropriate actions. Error reporting normally takes the form of a distribution log file that records success, failure, or errors encountered. In some cases a more active form of error reporting may be required, where email messages may be automatically generated and sent to either the administrator or, in some cases, the affected clients 26. If a fatal error is detected, the software distribution tool 80 will reverse any changes made to that point and restore the clients 26 to their previous state.

As illustrated in FIG. 8, the preferred operations architecture 78 includes configuration and asset management tools 82. To manage a data warehouse computing system 20, one must have a solid understanding of what is located where, and one must maintain rigor in the change control procedures that govern modifications to the data warehouse computing system 20. Configuration and asset management information that the configuration and assent management tools track includes such details as product licensing information, warranty information, vendor names, logical and physical device information (such as total capacity and current utilization), product configuration tracking, software and data version levels, network configuration parameters, physical location, and perhaps accounting information.

In larger data warehouse computing systems 20 an underlying configuration and asset management database is used to keep track of configuration and asset information in the data warehouse computing system 20. This database becomes a key information source for those managing, maintaining, and adding to the data warehouse computing system 20. Automatic asset and configuration collection capability is included in many vendor solutions, including OpenView from Hewlett-Packard (HP), and POLYCENTER Systems Census from Digital Equipment Corp. These products can be wed to interrogate the data warehouse computing system 20 and discover network and computing devices, and collect related information about these devices. In addition, these products can perform the needed periodic auditing to detect changes to the environment over time—for example, when a client 26 moves a machine or installs a network game. Those skilled in the art would recognize that various configuration and asset information may be collected and stored about the resources using the data warehouse computing system 20.

Another important and related feature that is provided by the configuration and asset management tools 82 is the ability to restore a machine (i.e., clients 26 or servers 16) to a known or initial configuration for problem resolution. The configuration and asset management tools 82 provide facilities for determining the correct initial state for a given machine or network device and initiates any software distribution or configuration changes needed to bring the device back within compliance. For more dynamic data warehouse computing systems 20, where machine and network configurations are changing frequently, it is even more important to have an active configuration and asset management system. The capability to automatically change configurations of a large number of machines and network components or even to roll back to previous configuration settings for any particular device becomes increasingly important and is provided by the preferred configuration and asset management tools 82.

A well-functioning configuration and asset management tool 82 becomes a vital information source for conducting impact analysis for any requested changes to the data warehouse computing system 20. The frequency with which unexpected negative side effects are caused by relatively minor configuration changes to the data warehouse computing system 20 has been an embarrassing and frustrating surprise for many adopters of the technology.

Much of the source of these problems relates to the high number of execution architecture components and complex interdependencies between them. Another problem is the reality that most data warehouse computing systems 20 involve numerous independent vendors. Changing even the release level of one systems software component may have a ripple effect and may require updates to, or newer versions of, additional software components or applications.

To support this type of impact analysis, dependency information is maintained by the configuration and asset management tools 82. For example, version X of the Oracle database management system requires version Y or greater of the HP-UX operating system and version Z of yet another vendor's Transmission Control Protocol/Internet Protocol product to function properly. It is not uncommon for a user organization to wish to return to a previous operating system release to acquire an application package that does not yet support the latest operating system version. The configuration and asset management tools 82 maintain relationship information so that it is not purely guesswork if in fact the proposed version change will break any required dependencies of the data warehouse computing system 20.

The configuration and asset management tools 82 also enforce the appropriate degree of standardization across network environments in the data warehouse computing system 20. For large data warehouse computing systems 20, where thousands of clients 26 are involved, it is not feasible to effectively manage the environment if each client 26 has its own unique configuration and combination of software products. On the other hand, it is not typically appropriate to give thousands of users the exact same configuration if the users perform different functions within the organization. For example, users in such diverse areas as sales, product development, and human resources are likely to require different computing capabilities. The goal is to strike the correct balance between standardization, which simplifies the required operations architecture and tasks, and accommodation to each business area's unique computing needs.

Referring to FIG. 8, the preferred operations architecture 78 includes fault management and recovery management tools 84. Failure control is important in a data warehouse computing system 20. The presence of heterogeneous equipment, however, makes it difficult to determine the origins of a fault. Multiple messages may be generated within the system from a single fault, making it difficult to separate the fault's cause from its effects.

The fault management services and recovery management tools 84 of the operations architecture 78 assist in the diagnosis and correction of system faults in the data warehouse computing system 20. Faults may include network-, server-16, client-26, or even application-level faults. Fault diagnosis requires services for isolation; viewing of host, server 16 and client 26 error logs; and determining the software and data versions and configurations of affected machines.

The fault management and recovery management tools 84 also include network management and diagnostic tools for monitoring and reporting on network traffic and failures on the data warehouse computing system 20. Additional diagnostic tools such as protocol analyzers may also be included to determine the true source of the problem.

Another factor to consider in this selection is the choice between integrated operations environments (typified by HP's Open View or CA-Unicenter TNG), and point solutions that provide only one function. Although most integrated tool sets today do not adequately address the full breadth of fault management and diagnostic requirements, they can reduce the number of vendors and the complexity of integrating these point solutions.

Recovery capabilities are also included in the fault management and recovery management tools 84. Recovery capabilities span the range from those required to bring up a client 26 or server 16 after it has failed to those required in the event of a major disaster. With critical business applications being rolled out on distributed technologies, the recovery of these systems must be easy, quick, and efficient. Loss of the data warehouse computing system 20 for even a short period can result in significant financial losses to the business.

A wide variety of recovery tools may be required for fault recovery. These range from strictly network-oriented components (for restoring links or reconfiguring components) to more systems-level components (for restarting processes on machines or restoring databases). More involved tasks, such as the distribution of software fixes to clients 26 or servers 16, may require the ability to remotely reboot and reinitialize machines, printers, or other network components. Those skilled in the art would recognize that the application of the preferred fault management and recovery management tools 84 will vary, depending on the needs and requirements placed on the data warehouse computing system 20.

As illustrated in FIG. 8, the preferred operations architecture 78 includes capacity planning tools 86. The capacity planning tools 86 focus on individual components of an environment such as the network, physical space, and processing power to understand the need to change the capacity of those components based on organizational changes. The capacity planning tools 86 preferentially include applications that monitor a plurality of predetermined system usage levels in the data warehouse computing system 20.

The system usage levels are preferentially selected from the group consisting of server processing usage, server bandwidth usage, server storage usage and client usage. The server processing usage information relates to the processing power being consumed by servers 16 during operation. If a portion of the data warehouse computing system 20 uses the Internet, the server bandwidth usage information will relate to the amount of Internet traffic that is taking place over the an Internet connection with the servers 16 of the data warehouse computing system 20. The server storage information relates to the amount of drive space available and being used on the servers 16 of the data warehouse computing system 20. The client usage information relates to various items that can be stored about a respective client's 26 session with the data warehouse computing system 20.

The capacity planning tools 86 typically focus on components that are considered to be heavily sensitive to changes in computing resource usage. The preferred capacity planning tools 86 may use historical management data combined with estimates for growth or changes to configuration to simulate the ability of different system configurations to meet capacity needs. Capacity planning tools 86 can sometimes be integrated into a larger integration platform, or they can be standalone applications, depending on the needs and requirements of the data warehouse computing system 20.

As previously set forth, referring to FIG. 8, the preferred operations architecture 78 includes performance management tools 88. The performance management tools 88 include applications that monitor the performance of computing resources and data warehouse applications that are running on the data warehouse computing system 20. Performance is an issue that underlies practically every component within the data warehousing computing system 20. Performance management tools 88 should be designed to assist every architecture described above, in areas such as loads, index builds, the transfer of large data files across the network, the response time of user queries, and the length of backup and restores, to name a few. Performance is often the 'weak link' in the chain that can mean the difference between a successful and an unsuccessful data warehouse computing system 20 in the eyes of the end-user 24. Like any large complex technical environment, proper gathering of user requirements, setting of expectations via service level agreements, performance testing and ongoing performance tuning all contribute to proper performance management within a data warehouse computing system 20.

Performance tuning issues are no longer confined to the network or to central processing units in data warehouse computing systems 20. Performance tuning needs to be viewed in an end-to-end manner, accounting for all the factors that affect the performance of the data warehouse computing system 20 relative to a user request from a respective client 26. Those skilled in the art would recognize that the particular design of applications used in the performance management tools 88 will vary depending on the needs and requirements of the data warehouse computing system 20.

The creation of a customer order, for instance, may involve multiple server 16 accesses for data and information to be exchanged between the client 26 and the host server 16. The performance relative to the entire business event needs to be considered, not simply the performance of a single component involved. As such, the performance management tools 88 include applications that surround processes occurring on the data warehouse computing system 20 that monitor the performance of devices (i.e., clients 26; server 16) to calculate and provide end-to-end performance information.

The preferred operations architecture 78 for the data warehouse computing system 20 also includes license management tools 90. The license management tools 90 include applications that focus on guaranteeing compliance with software license agreements for various vendor applications that are used on the data warehouse computing system 20. Since the advent of computer networks that allow applications to be shipped and installed around the network as required, the issue of license management has become increasingly important. Application vendors have been experimenting with various licensing strategies, including unrestricted site licenses, fixed concurrent user licenses, and floating licenses that actually enforce the restriction on concurrent users.

Independent of these actions by software vendors, large organizations struggle to keep a handle on exactly what software products they own and how many copies they own. They have also been working to ensure that they are in compliance with software licensing agreements while not paying for more copies of software than they truly require. As such, the licensing management tools 90 allow administrators to monitor and track applications that have licensing requirements to ensure compliance with the terms of each respective agreement.

In addition to guaranteeing compliance with software licensing agreements, the preferred license management tools 90 are capable of providing license report detailing which clients 26 and how many clients 26 are actually using a given software application. If, in fact, the license report indicates that the organization has over-purchased, it may be possible to realize some savings by reducing software licensing agreements, or vice versa. Those skilled in the art would recognize that several applications may be provided in the license management tools 90 to ensure license agreement compliance, depending on the particular applications provided in the data warehouse computing system 20.

As distributed environments allow users more flexibility in terms of where they work, the ability of a centralized support group to effectively manage remote clients 26 has become important. Visibility to the configuration of a respective remote client 26 is only possible by physically sitting at the workstation and diagnosing problems or by accomplishing the same remotely.

As illustrated in FIG. 8, the preferred operations architecture 78 also includes remote management tools 92. The remote management tools 92 allow support personnel to "control" an end-user's 24 desktop over the data warehouse computing system 20 so that the support personnel do not need to be physically present at a particular client 26 to diagnose problems. Once control of the desktop on the client 26 is established by the remote management tools 92, screen updates for the controlled desktop are displayed at both locations. The support person will typically be located at another client 26 that is connected with the data warehouse computing system 20. The support person is then effectively sitting at the client 26 he/she controls and can do necessary diagnostics.

In addition to problem diagnosis, the remote management tools 92 provide visual explanations to user questions. For example, if a user has a question about a certain application feature, the support person may remotely control the end-user's 24 desktop, then walk through the solution while actions are displayed on the screen of the client 26.

The preferred remote management tools 92 are also useful in organizations where 24×7 support is required. Rather than requiring support personnel to be physically present for all events, they may be able to dial in through the remote management tools 92 from home and accomplish the same tasks. The ability to perform these tasks remotely can have positive effects on overall support costs through a reduction in the amount of time needed to resolve problems. Remote management tools may come bundled with an integration platform such as HP Open View or Tivoli TME, or they may be purchased as third-party software packages or designed specifically for the data warehouse computing system 20.

The preferred operations architecture 78 also includes event management tools 94. The event management tools 94 include applications that manage a plurality of predetermined events generated by applications or devices on the data warehouse computing system 20. The predetermined events may relate to disk space indications, central processing unit utilization indications, database error indications, network error indications, application error indications and file and print service indications. Those skilled in the art would recognize that other predetermined events could be monitored depending on the needs of the respective data warehouse computing system 20.

In addition to hardware devices, applications and systems software generate events on the data warehouse computing system 20. Common event-handling applications are used to provide information to management in a simple, consistent format and to forward on important events for management purposes. Those skilled in the art would recognize that events the event management tools 94 are design to monitor will vary. The applications that are designed for the preferred event management tools 94 preferentially monitor a plurality of predetermined events that might occur in various applications on the data warehouse computing system 20.

The preferred operations architecture 78 also includes systems monitoring and tuning tools 96. The number of devices and the geographic disparity of devices used in a data warehouse computing system 20 increase the effort required to monitor the system. Monitoring is not different for data warehousing than for other applications, although it may be more complex. The number of events generated in the data warehouse computing system 20 rises due to the increased complexity. Devices such as clients 26, network components (software and hardware), and servers 16 generate events on startup or failure to periodically report device status. Monitoring will need to exist over multiple platforms, both at the operating system and at the database levels. Generally, existing client tools and standards can be used to monitor the data warehouse computing system 20, although a new data warehouse computing system 20 could require new toolsets and skills. The monitoring of database usage is important but often neglected. This information is necessary to determine the popular information being requested out of the data warehouse computing system 20 and to identify performance bottlenecks. This information assists in both the ongoing tuning of the data warehouse computing system 20 to handle current and future volumes, and the assessment of creating new summarization tables or data marts 42 to handle highly-requested information.

The application used in the systems monitoring and tuning tools 96 are designed to detect and record predetermined events that occur on the clients 26 or servers 16. The predetermined events may be from applications, databases, networks, clients 26, servers 16. Those skilled in the art would recognize that the term event should be broadly construed to cover any event that can be monitored and recorded in the data warehouse computing system 20.

The security tools 98 include applications that implement a predetermined security policy on the data warehouse computing system 20. As illustrated in FIG. 8, the operations architecture 78 also include security tools 98. A security policy is the set of rules, directives, and practices that regulate how an organization manages, protects, and distributes sensitive information on the data warehouse computing system 20. A security policy is translated into access control rules that are enforced by the security tools 98.

The preferred security tools 98 of the operations architecture 78 include identification tools and authentication tools. The identification tools are used to provide an identifier for users of the data warehouse computing system 20. An identifier is a piece of data used to uniquely identify an entity in a transaction. The identifiers are unique and associate the entity with the identifier. The identifiers are issued to entities during part of a registration process that validates an entity's request to participate in a system, generates a unique identifier, binds that identifier to the requesting entity, and distributes the identifier to the now participant entity.

Once participating entities have been registered, the authentication tools validate the identifier during a transaction. Authentication applications validate that the entity requesting access to the resources of the data warehouse computing system 20, whether that is a human or automated process, is the true owner of that identity. Authentication can be performed by three primary methods: by validating what the user/entity knows, what they have, or what they are. For instance, validating by what the user identity knows may be done by using secret passwords, PIN numbers, credit card numbers or mother's maiden name. Validating by what the user has can be done using an ATM card, credit card, smart card or a private key stored on an encrypted file on the client 26. Validating by what the user is can be done using various biometric verification means such as voice prints, iris scan, signature verification and thumb scan.

The preferred security tools 98 provide access control to the data warehouse computing system 20. Once the identity has been established, access control rules determine what resources the entity may use. Access control is used to permit or deny a specific type of use system resources on the data warehouse computing system 20. For example, a user may be authorized to access a resource, but only for reading. Access control can be used to arbitrate access to files, processes, operating system ports, application functions, database tables, portions of a network (such as through virtual or dedicated circuits and firewalls), and other types of resources. This is preferentially accomplished through the use of Access Control Lists (ACLs) in the data warehouse computing system 20. An ACL for a resource specifies the user or group and the type of access permitted (read, write, etc.). ACLs may optionally include date and time restrictions and program restrictions.

Another way the security tools 98 can provide access to the data warehouse computing system 20 may be through the use of role based access control. Role based access control associates a job function/role to a set of resources on the data warehouse computing system 20, and then assigns the user to a particular role. So, for example, the role of junior bookkeeper may have read and write access to the petty case account, but read-only access to the general ledger. The advantage of role based access control is that it facilitates the management of access control and prevents users from retaining access to data that is no longer needed as they move from role to role.

Resource access control may be either restrictive or permissive in the data warehouse computing system 20. Restrictive resource access control is based on the policy that whatever is not explicitly prohibited is allowed. Each of these methods has a.use, depending on the requirements of the data warehouse computing system 20. For network and firewalls, restrictive access control is commonly used. For most servers 16, permissive access control is the norm. Those skilled in the art would recognize that variations exist on the exact manner in which access control is provided and are envisioned.

The preferred security tools 98 also include auditing tools. Auditing tools are used to record accesses to resources on the data warehouse computing system 20, and may be implemented at a number of layers, including operating system, database, application, middleware, as well as in network devices such as firewalls 24 and routers. Auditing is typically implemented in combination of these layers to allow reconstruction of events after a security problem is detected. The logs kept by the auditing tools are preferentially searchable for known or suspected patterns of abuse, and are protected from alteration. Logs can monitor a variety of data, including access times, user Ids, locations, actions the user performed, and whether or not those actions were successfully completed.

The preferred security tools 98 may also include integrity tools. Integrity refers to the property that any system must have if it is to protect itself and enforce its security policy. During operation, the integrity tools protect the data warehouse computing system 20 from buffer overflows, faulty parameters, or attacks on improperly-configured network ports have failed to meet the integrity requirement. The integrity tools also protect the data warehouse computing system 20 from viruses. Viruses constitute what is probably the best known attack on integrity in a data warehouse computing system 20.

The preferred security services 98 also includes cryptographic tools. Public key cryptography is one of the most important enabling technologies in the data warehouse computing system 20. The cryptographic tools ensure that messages are accessible only by those properly authorized, even when they traverse insecure networks. The term "message" broadly refers to an e-mail dispatch, or the more dynamic transactions of web sessions between clients 26 and the server 16. The cryptographic tools also ensure that a message is actually sent by the purported sender. Further, the cryptographic tools check for integrity to provide assurance that the message has not been modified in transit and also ensures that a sender cannot disavow a message.

The preferred cryptic tools use keys to encrypt communications. There are two types of keys used in the preferred data warehouse computing system 20. A secret key is one type of key that is used and a key that is shared between two entities in a transaction. Because the same key is used to encrypt and decrypt data, this is referred to as symmetric key encryption. In order for the parties to communicate, they must establish the secret key in advance, using a secure channel. The most common implementation of a symmetric key algorithm is the Data Encryption Standard (DES). A public/private key pair or asymmetric key is the second type of key that is used and uses a pair of keys to encrypt and decrypt messages. Messages encrypted using one of the keys can only be decrypted with the other key. Each party possesses a pair of keys, one public key accessible to all participants in the system, and one private key accessible only to the party that owns it. The most common implementations of public key algorithms are supplied by RSA Data Security, Inc. In the most basic implementations, data is encrypted by the sender (i.e., client 26 or server 16) with the public key of the recipient (i.e., client 26 or server 16) and decrypted by the recipient with their private key.

Although public key cryptosystems do not require users to share a common secret key, key management is still a serious problem. Public key systems require a binding between a specific public/private key pair and an entity that is participating in the system. When using a public key to protect information destined for a specific entity, the user assumes that the public key he or she uses is really the one belonging to the entity. As such, in the preferred embodiment of the invention this binding is assured through the use of a trusted third party (TTP), called a Certificate of Authority, or CA.

Recall that the method for transmitting a message using public key cryptography is to encrypt the message with the receiver's public key. The benefit is that a user's public keys can be sent as clear text, or even published in a directory. So, if Alice wants to send a message to Bob, but is tricked into using Eve's public key, then Even will be able to intercept the message. (Eve can then, if she chooses, re-encrypt the message using Bob's actual public key, and neither Alice nor Bob will be the wiser.) In a data warehouse computing system 20, which is in effect a global network lacking face-to-face contact, users must be assured they are using the right key. The CA provides this in the preferred data warehouse computing system 20.

The CA serves a function analogous to that of a passport or drivers license in the data warehouse computing system 20. The CA binds public keys to users and services similar to the way a passport agency issues you a passport that ties your name and relevant personal information to you with a picture. CAs deliver public keys through the use of certificates which are preferentially compliant with the X.509 standard. The CA will publish information to a directory, which contains an entry for each entity with a certificate.

Public key cryptosystems provide transaction authentication through the use of digital signatures. Digital signatures are created by the application of a hash function to a piece of data (e.g., a message). This message hash is then encrypted with a sender's private key. The message recipient can use the sender's public key to decrypt the message hash, and rerun the hashing algorithm to make sure the hash has not changed. If the two hashes match, the sender has been properly authenticated. Note that for authentication, the pattern of public/private key use is the reverse of that for confidentiality. For confidentiality, the sender encrypts with the receiver's public key. To provide authenticity, the senders encrypt with their own private key.

The preferred cryptographic tools also include certification services that support activities needed to verify that the certificates are properly used, to ensure the authenticity and confidentiality of communications and stored data. Key recovery services are also provided under the cryptographic tools. Data encrypted under a public key cannot be recovered without the private key. If the private key is rendered inaccessible (through file corruption, token destruction, or failure), it is essential that the cryptosystem owner/operator provide a means for recovering that data. As such, the key recovery services allow private keys to be recovered in case the private key is lost or damaged.

The preferred cryptographic tools also include revocation services. In any public key cryptosystem, keys will eventually be compromised, either because they are lost or stolen. The revocation services allow users to notify an administrator if their keys are compromised, to disseminate the list of compromised keys to all participating entities, and to issue new keys to replace compromised keys. Since public key binding is typically carried out using X.509 compliant certificates, this process may also be referred to as certificate revocation.

As illustrated in FIG. 8, the preferred operations architecture 78 also includes user administration tools 100. The data warehouse computing system 20 introduces many new challenges to the task of user administration. Adding an end-user 24 to the data warehouse computing system 20 may require adding end-user 24 to the network, one or more server 16 operating systems, one or more database systems (so that the user can access data), an e-mail system, and an existing host-based system. In some cases, the addition of an end-user 24 may require entries to be added to several individual system components. The preferred user administration tools 100 allow an administrator to add end-users 24 to the data warehouse computing system 20 in an orderly and automated fashion to eliminate the problems encountered when adding end-users 24. The preferred user administration tools 100 also allow the administrator to delete end-users 24 from the data warehouse computing system 20. Unless careful records are kept, it can be very difficult to determine to which machines, databases, and applications the end-user 24 had been added originally so that this information can be deleted. From an administration standpoint this may seem to be only a headache, but from a security standpoint it represents a substantial risk. The preferred user administration tools 100 keep track and allow the deletion of end-user 24 to be accomplished in an orderly and automated fashion.

Most user administration products on the market today focus on the operating system aspect of the problem (adding user access to the server, setting file permissions, group associations). Although these solutions are certainly helpful, they do not cover many of the more difficult user administration challenges such as database access, e-mail, and networking software. Each of these products often comes with its own administration tools which may simplify the individual administration tasks but do little to help with providing an integrated user administration approach. The preferred user administration tools 100 provide an integrated approach to handling the types of access that users are granted to the data warehouse computing system 20.

An alternative approach to the user administration tools is to implement a single sign-on (SO) application in the data warehouse computing system 20. These applications are meant to eliminate the need for end-users 24 to remember user names and passwords to all of their business applications. The first time end-users 24 log in, end-users 24 enter a user name and password into the SSO application which then automatically logs into applications through a scripting process. An advantage to this approach is that through implementing SSO, a database that maps users to the applications they access is created. This significantly simplifies user administration, and can increase security as well. A key drawback to SSO applications is failover. If a SSO server fails, users cannot access applications as they do not remember passwords to all their applications.

The preferred operations architecture 78 also includes production control application set 102. In distributed environments, processes may be taking place across the entire system on multiple platforms in either a parallel or a serial fashion. Batch dependencies may be required across platforms, and multiple time zones may be involved. In addition, many non-mainframe-based applications do not provide production scheduling capabilities included with the application. For these reasons, scheduling processes across the data warehouse computing system 20 can be quite complex, requiring significant management effort to ensure that the processes run smoothly. The preferred production control application set 102 includes print management tools, file transfer and control tools, mass storage management tools, backup and restore tools, archiving tools, and system startup and shutdown tools that ensure that processes run smoothly on the data warehouse computing system 20.

The print management tools include applications that handle printing documents on the data warehouse computing system 20. The file transfer and control tools handle the transferring of files from one location to another location in the data warehouse computing system 20. The mass storage management tools monitor and control database files and various other kinds of data files that are stored in the data warehouse computing system 20.

The backup and restore tools are used by the data warehouse computing system 20 to backup and restore files that are used on the data warehouse computing system 20. Backup and restoration processes become more complex in a distributed environment as business-critical information becomes distributed across the data warehouse computing system 20. Backup strategies used coordinate information across the data warehouse computing system 20 and determine where the backup copy or copies of information will reside. As with centralized computing environments, restoration processes are directly dependent on how backup was performed. A single restore process no longer suffices. Depending on a particular fault, restoration services may only need to be performed for a portion of the data warehouse computing system 20, while the rest of the data warehouse computing system 20 stays up and running.

Timely backups and restores of the data warehouse computing system 20 are arguably the most important operational activity for the data warehouse computing system 20. Backup and restore procedures must meet user and business requirements for frequency of execution and speed of recovery. Backup and restore procedures must also be carefully designed to handle high volumes of data typically found in a data warehouse computing system 20 while meeting user availability requirements, scaling for future growth, and minimizing performance impact.

Backup procedures will need to be highly parallel for large data warehouses computing system 20 to minimize execution time and impact on users. These procedures will need to pull data out of multiple database tables and/or databases to multiple backup drives concurrently. Many data warehouse computing systems 20, especially those with global end-users 24, are backed up on-line so end-users 24 need not be removed from the data warehouse computing system 20. Also important is minimizing the length of the recovery window, and ensuring that a restore can occur within a reasonable timeframe. If data becomes corrupted in a large data warehouse computing system 20, there are many steps that need to occur to perform a restore. Data from the backup media must be reloaded into the database, updates since the last backup applied, and indexes rebuilt. Any of these steps could take days for hundreds of gigabytes worth of data without high levels of power and parallelism.

The archiving tools include applications that are responsible for archiving files on the data warehouse computing system 20. The issues surrounding archiving are quite similar to those surrounding backup. The archiving tools place limitations on the amount of information that may be archived on the data warehouse computing system 20 as a result of the space limitations on servers 16 and clients 26. Additional problems are created with archiving in a distributed environment, because users have no incentives to perform housekeeping tasks on their devices. Depending on the users' ability to store information on the clients 26 or on the server 16 the clients 26 may become cluttered with seldom-used files. Lack of space may affect other processes that need to take place on these devices, such as software and data distribution. The preferred archiving tools solve these problems by providing regular archiving procedures that automatically archive a predetermined set of files.

Archiving is an important, but often neglected operational activity within a data warehouse computing system 20. The data warehouse computing system 20 should not keep data indefinitely, given the cost of the additional disk storage, and the potential complexity and performance impact of having to continually backup, index and maintain excess detailed data. The backup procedures can be slightly modified to archive old and stale data from the data warehouse computing system 20 to an off-line storage device.

The archiving process is driven by user requirements for how long data should be kept on-line, how long it takes for archived data to be restored from off-line storage, and how long off-line data should be kept before being erased. Often there is not one blanket requirement—there can be multiple archiving requirements depending on the level of detailed data, the subject area, or both.

Referring to FIG. 8, the preferred operations architecture 78 also includes a help desk tool 104. The data warehouse computing system 20 puts the operations help desk tools 104 closer to the "end user" in terms of visibility and influence. The help desk tools 104 are integrated with the business processes being supported through the data warehouse computing system 20. If the help desk tools 104 are well integrated with the business process, there is risk, that the user may be given incorrect information, be forwarded to the wrong department, or otherwise mishandled. It is also important that the information collected by the help desk tools 104 about a user be properly shared with other stakeholders in the business process, which is also provided by the preferred help desk tools 104.

The preferred help desk tools 104 turn web browsers on the clients 26 into interactive clients of the help desk with the power to enter, query and modify help desk requests. The preferred help desk tools 104 allow users to directly perform most of the help services provided by the help desk tools 104 without assistance from the help desk staff. As such, the preferred help desk tools 104 are capable of providing automated assistance to users on the clients 26.

Another key function provided by the help desk tools 104 in the data warehouse computing system 20 is for users to more effectively support themselves. In Internet environments, it is usually prohibitively expensive for a service provider to provide interactive help desk support to all interested Internet users. This is due to potential volumes of support requests as well as the diversity of technical environments that could be encountered. Consequently, it is often more reasonable to provide Internet users with access to the required applications of the help desk tools 104. In the preferred embodiment, the preferred help desk tools 104 include a download site where patches, drivers, and self-help support materials are available.

The help desk tools 104 also use metrics to measure the performance of support personnel that consider interactions via e-mail or video. An example metric might be the "number of e-mails answered per hour." In addition, existing metrics may need to be refined to fairly reflect data warehouse characteristics. Those skilled in the art would recognize that several metric values can be monitored and kept track of by the data warehouse computing system 20.

The preferred help desk tools 104 are available continuously in the data warehouse computing system 20. In addition, in data warehouse computing systems 20 there may be additional complexities of help desk operations introduced by global interactions. For example, the preferred help desk tools 104 support web page generation and e-mail support using multiple languages. Those skilled in the art would recognize that the applications used in the preferred help desk tools 104 will vary depending on the needs of each particular enterprise.

Referring to FIG. 8, in one embodiment the operations architecture 78 includes transport tools 106. The transport tools 106 move data between physical data servers 16. The transport tools 106, an overlap with the population architecture 140, is usually part of the job stream that performs file transfer, control and scheduling. Some data movement and transformation software incorporate transport logic into their processing, for example, to perform compression, conversion (e.g., EBCDIC to ASCII), messaging, reconciliation of record counts, or file transfer.

As set forth above, the operations architecture 78 consists of different operations tools that focus on different functions, such as the help desk tools or fault management and recovery management tool 84. Each tool introduces a predetermined set of operations services such as core management logic and event generation. Although product selection decisions are often based on the functions that a product provides, true integration of these tools into a cohesive operations architecture requires a service-based view, rather than a functional view and many specialized applications to integrate the tools.

It is therefore important to consider the services provided by the operations architecture tools when selecting operations tools. The services provided by the operations architecture 78 are core management logic, integration platform, event/data generation, event processing, and repositories.

The core management logic services apply business roles to management data. Core management logic is typically specific to the function being served by an operations tool. For example, core management logic of a backup/restore application of the production control application set 102 would initiate a backup process based on the time of day information it receives from a system clock. Core management logic receives data from event/data generation, event processing, and repositories services and then sends data for presentation or to repositories services. In addition, core management logic often polls the event/data generators for information.

The integration platform services provide a common platform for the tools of the operations architecture 78. At the lowest level this means common standards, interfaces, message formats, and file logging forms to be used with all the tools. Though the integration platform can be home-grown, these applications are growing extremely complex, suggesting the use of one of many available third party integration platforms.

There are two types of third party platforms available. The first group are framework type products such as HP Open View, CA-Unicenter TNG, and Tivoli Management Environment. These products are modular. Each module within the suite can be run separately; however, they all conform to a common framework which allows for greater compatibility, integration and better performance. The second type of integration platform is point-solution oriented. Products like Boole and Babbage implement this approach which typically results in best-of-breed solutions for various management solutions, but a larger amount of integration work between tools is required.

The event/data generation services interact with all the managed components in the execution and development environments in order to produce the required management information. The output of event/data generation services is actual raw management data that can then be processed and acted upon.

The event processing services manipulate the raw data obtained by event/data generation services into a form on which operations personnel can take action. This service may perform several functions such as event filtering, alert generation, event correlation, event collection and logging, and automatic trouble ticket generation. When management events are generated, event filtering mechanisms constantly compare predetermined event thresholds to current management events to determine the need for a management alert. If the threshold is exceeded, the event filtering function takes a specific action based on predetermined rules. When an event filter has noted the need for an alert, the alert generation function creates the proper notification. This may take one of several forms; a page, an email, a display change (icon changes color to red), etc.

Event correlation functions use logic to tie different events together with the intention of understanding potentials causes of problems. For example, nightly processing utilization shortages may be tied by event correlation functions back to a nightly batch job. It may be determined that historical analysis of management events is important. If so, the collection and logging of management events into repositories is important so that reporting and correlation activities can be performed at a future time. Automated trouble ticket generation. For certain events, it may be desirable for trouble tickets to be generated automatically in an organization's help desk system so that action can be taken.

The repository services contain all the management data generated or used during the management process. This data includes historical data, capacity data, performance data, problem knowledge bases, asset databases, solution sets, and management information bases (MIBs).

The preferred operations architecture 78 consists of a set of tools that allow administrators to effectively manage a distributed environment. For other features, advantages and combinations of the present invention refer to U.S. provisional application Ser. No. 60/156,962, which is herein incorporated by reference in its entirety.

Thus, there has been disclosed in accordance with the invention, a data warehouse computing system that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

What is claimed is:

1. An operations architecture for a data warehouse computing system, the operations architecture being used to design, build and enhance the data warehouse computing system, the operations architecture comprising:
    a web server connected through a firewall with a client, the web server providing a plurality of tools accessible via a common user interface, the plurality of tools including:
    a software distribution tool, a configuration and asset management tool, a fault management and recovery management tool, a capacity planning tool, a performance management tool, a license management tool, a remote management tool, a event management tool, a systems monitoring and tuning tool, a security tool, a user administration tool, a production control application set and a help desk tool supporting said web server and said client in said data warehouse computing system; and
    wherein said common user interface is configured to present an interactive graphical user interface to said client that provides access to all of said tools and enables design, building and enhancement of the data warehouse computing system with said tools, wherein all of said tools of are presented by the common user interface in a single view.

2. The operations architecture of claim 1, wherein said software distribution tool provides automated delivery to, and installation of, applications on said web server and said client.

3. The operations architecture of claim 1, wherein said configuration and asset management tool that manages a plurality of predetermined assets connected with said data warehouse computing system.

4. The operations architecture of claim 3, wherein said predetermined assets may be selected from the group consisting of said web server, said client, a product license information file, a warranty information file, a vendor name file, a logical device information file and a physical device information file.

5. The operations architecture of claim 1, wherein said fault management and recovery management tool assists in the diagnosis and correction of a plurality of system faults in said data warehouse computing system.

6. The operations architecture of claim 1, wherein said capacity planning tool monitors a plurality of predetermined system usage levels in said data warehouse computing system.

7. The operations architecture of claim 6, wherein said system usage levels may be selected from the group consisting of web server processing usage, web server bandwidth usage, web server storage usage and client usage.

8. The operations architecture of claim 1, wherein said performance management tool monitors the performance of applications running on said data warehouse computing system.

9. The operations architecture of claim 1, wherein said license management tool manages and controls license information for applications running on said data warehouse computing system.

10. The operations architecture of claim 1, wherein said remote management tool allows support personnel from said data warehouse computing system to take control of said client.

11. The operations architecture of claim 1, wherein said event management tool is responsible for handling a plurality of predetermined events in said data warehouse computing system.

12. The operations architecture of claim 11, wherein said predetermined events may be selected from the group consisting of disk space indications, central processing unit utilization indications, database error indications, network error indications and file and print service indications.

13. The operations architecture of claim 1, wherein said systems monitoring and tuning tool monitors applications, middleware, databases, networks, clients and web servers on said data warehouse computing system.

14. The operations architecture of claim 1, wherein said security tool includes applications that provide security to said data warehouse computing system.

15. The operations architecture of claim 1, wherein said user administration tool is used for administering users of said data warehouse computing system.

16. The operations architecture of claim 1, wherein said production control application set is used for scheduling and processing a plurality of production processes on said data warehouse computing system.

17. The operations architecture of claim 16, wherein said production control application set may be selected from the group consisting of a print management tool, a file transfer and control tool, a mass storage management tool, a backup and restore tool, a archiving tool and a system startup and recovery tool.

18. The operations architecture of claim 1, wherein said help desk tool provides a help application for assisting users of applications on said data warehouse computing system.

19. An operations architecture for a data warehouse computing system, the operations architecture being used to design, build and enhance the data warehouse computing system, the operations architecture comprising:

a web server connected through a firewall with a client, the web server providing a plurality of tools accessible via a common user interface, the plurality of tools including:
a software distribution tool for providing automated delivery to, and installation of, an application on said web server or said client;
a configuration and asset management tool for managing a plurality of predetermined assets connected with said data warehouse computing system;
a fault management and recovery management tool for assisting in the diagnosis and correction of a plurality of system faults in said data warehouse computing system;
a capacity planning tool for monitoring a plurality of predetermined system usage levels in said data warehouse computing system;
a performance management tool for monitoring the performance of applications running on said data warehouse computing system;
a license management tool for managing and controlling license information for applications running on said data warehouse computing system;
a remote management tool allowing support personnel from said data warehouse computing system to take control of said client;
a event management tool for handling a plurality of predetermined events in said data warehouse computing system;
a systems monitoring and tuning tool for monitoring applications, middleware, databases, networks, clients and web servers;
a security tool that includes a security application that provides security to said data warehouse computing system;
a user administration tool for administering users of said data warehouse computing system;
a production control application set for scheduling and handling a plurality of production processes on said data warehouse computing system;
and a help desk tool including a help application that provides users of applications on said data warehouse computing system with assistance,
wherein said common user interface is configured to present an interactive graphical user interface to said client that provides access to all of said tools and enables design, building and enhancement of the data warehouse computing system with said tools, wherein all of said tools of are presented by the common user interface in a single view.

20. The operations architecture of claim 19, wherein said predetermined assets may be selected from the group consisting of said web server, said client, a product license information file, a warranty information file, a vendor name file, a logical device information file and a physical device information file.

21. The operations architecture of claim 19, wherein said system usage levels may be selected from the group consisting of web server processing usage, web server bandwidth usage, web server storage usage and client usage.

22. The operations architecture of claim 19, wherein said predetermined events that said event management tool handles may be selected from the group consisting of disk space indications, central processing unit utilization, database error indications, network error indications and file and print web server indications.

23. The operations architecture of claim 19, wherein said production control application set may be selected from the group consisting of a print management tool, a file transfer and control tool, a mass storage management tool, a backup and restore tool, a archiving tool and a system startup and recovery tool.

24. A method of providing an operations architecture for a data warehouse computing system including a client connected through a firewall with a web server, comprising the steps of:
providing a plurality of tools accessible via a common user interface, said tools including:
using a software distribution tool for providing automated delivery to, and installation of, a predetermined application on said web server or said client;
managing a plurality of predetermined assets connected with said data warehouse computing system with a configuration and asset management tool;
assisting in the diagnosis and correction of a plurality of system faults in said data warehouse computing system with a fault management and recovery management tool;
monitoring a plurality of predetermined system usage levels in said data warehouse computing system with a capacity planning tool;
monitoring the performance of applications running on said data warehouse computing system with a performance management tool;
managing and controlling license information for applications running on said data warehouse computing system with a license management tool;
allowing support personnel to take control of said client with a remote management tool;
handling a plurality of predetermined events in said data warehouse computing system with a event management tool;
monitoring a plurality of computing devices connected with said data warehouse computing system with a systems monitoring and tuning tool;
securing said data warehouse computing system with a security tool;
administering users of said data warehouse computing system with a user administration tool;
scheduling and handling a plurality of production processes on said data warehouse computing system with a production control application set; and
helping users encountering problems with applications on said data warehouse computing system with a help desk tool;
wherein said common user interface is configured to present an interactive graphical user interface to said client that provides access to all of said tools and enables design, building and enhancement of the data warehouse computing system with said tools, wherein all of said tools of are presented by the common user interface in a single view.

25. The method of claim 24, wherein said predetermined assets may be selected from the group consisting of said web server, said client, a product license information file, a warranty information file, a vendor name file, a logical device information file and a physical device information file.

26. The method of claim 24, wherein said system usage levels may be selected from the group consisting of web server processing usage, web server bandwidth usage, web server storage usage and client usage.

27. The method of claim 24, wherein said predetermined events that said event management tool handles may be selected from the group consisting of disk space indications, central processing unit utilization, database error indications, network error indications, application error indications and file and printer service indications.

28. The method of claim 24, wherein said production control application set may be selected from the group consisting of a print management tool, a file transfer and control tool, a mass storage management tool, a backup and restore tool, a archiving tool and a system startup and recovery tool.

29. A data warehouse computing system, comprising:

a web server connected through a firewall with a client, the web server providing a plurality of tools accessible via a common user interface;

an operations architecture located on one of said web server and said client, said operations architecture being used to design, build and enhance the data warehouse computing system, said plurality of tools for said operations architecture comprising a software distribution tool, a configuration and asset management tool, a fault management and recovery management tool, a capacity planning tool, a performance management tool, a license management tool, a remote management tool, an event management tool, a systems monitoring and tuning tool, a security tool, a user administration tool, a production control application set, and a help desk tool supporting said data warehouse computing system; and a development architecture located on one of said web server and said client, said development architecture being used to design, build and enhance the data warehouse computing system, said plurality of tools for said development architecture comprising a common user interface between said web server and said client, a process management tool, a personal productivity tool, a quality management tool, a system building tool, an environment management tool, a program and project management tool, and an information management tool;

wherein said common user interface is configured to present an interactive graphical user interface to said client that provides access to all of said tools and enables design, building and enhancement of the data warehouse computing system with said tools, wherein all of said tools of are presented by the common user interface in a single view.

30. A data warehouse computing system, comprising:

a web server connected through a firewall with a client, the web server providing a plurality of tools accessible via a common user interface, the plurality of tools being used for a plurality of architectures, the plurality of architectures including:

a data warehouse architecture, located on at least one of the web server and the client, for distributing data from a data source to an end-user;

a development architecture, located on at least one of the web server and the client, for reducing the effort and costs involved with designing, implementing, and maintaining the data warehouse computing system; and an operations architecture, located on one of the web server and the client, for supporting the data warehouse architecture and the development architecture;

wherein said common user interface is configured to present an interactive graphical user interface to said client that provides access to all of said tools and enables design, building and enhancement of the data warehouse computing system with said tools, wherein all of said tools of are presented by the common user interface in a single view.

* * * * *

UNITED STATES PATENT AND TRADEMARK OFFICE
CERTIFICATE OF CORRECTION

| | | |
|---|---|---|
| PATENT NO. | : 7,003,560 B1 | Page 1 of 1 |
| APPLICATION NO. | : 09/705576 | |
| DATED | : February 21, 2006 | |
| INVENTOR(S) | : Nancy K. Mullen et al. | |

It is certified that error appears in the above-identified patent and that said Letters Patent is hereby corrected as shown below:

Column 43, in claim 1, line 24, after "all of said tools" delete "of".

Column 46, in claim 24, line 49, after "all of said tools" delete "of".

Signed and Sealed this

Twenty-seventh Day of March, 2007

JON W. DUDAS
*Director of the United States Patent and Trademark Office*